US006844816B1

(12) United States Patent
Melton et al.

(10) Patent No.: US 6,844,816 B1
(45) Date of Patent: Jan. 18, 2005

(54) AUTHENTICATION TECHNIQUES IN A MONITORING SYSTEM

(75) Inventors: Donald Alfred Melton, Boulder, CO (US); Todd James Wilbur, Westminster, CO (US)

(73) Assignee: BI Incorporated, Boulder, CO (US)

( * ) Notice: Subject to any disclaimer, the term of this patent is extended or adjusted under 35 U.S.C. 154(b) by 0 days.

(21) Appl. No.: 09/412,488

(22) Filed: Oct. 5, 1999

(51) Int. Cl.[7] ............................................. B60R 25/00
(52) U.S. Cl. ................................. 340/572.1; 340/5.27
(58) Field of Search ........................ 340/572.1, 572.4, 340/573.1, 573.3, 573.4, 5.26, 5.27, 825.49, 539

(56) References Cited

U.S. PATENT DOCUMENTS

| | | | |
|---|---|---|---|
| 4,734,680 A | 3/1988 | Gehman et al. | 340/539 |
| 4,761,778 A | 8/1988 | Hui | 370/46 |
| 4,918,432 A | 4/1990 | Pauley et al. | |
| 4,952,913 A | 8/1990 | Pauley et al. | |
| 4,952,928 A | 8/1990 | Carroll et al. | |
| 4,980,671 A | 12/1990 | McCurdy | |
| 4,990,892 A | 2/1991 | Guest et al. | 340/573 |
| 5,023,901 A * | 6/1991 | Sloan | 340/573.1 |
| 5,032,823 A | 7/1991 | Bower et al. | 340/568 |
| 5,117,222 A | 5/1992 | McCurdy et al. | |
| 5,146,207 A | 9/1992 | Henry et al. | |
| 5,182,543 A | 1/1993 | Siegel et al. | 340/531 |
| 5,189,395 A | 2/1993 | Mitchell | |
| 5,204,670 A | 4/1993 | Stinton | |
| 5,255,306 A | 10/1993 | Melton et al. | |
| 5,266,944 A | 11/1993 | Carroll et al. | |
| 5,369,699 A | 11/1994 | Page et al. | |
| 5,383,134 A | 1/1995 | Wrzesinski | 364/514 |
| 5,537,102 A | 7/1996 | Pinnow | 340/825.3 |
| 5,627,524 A * | 5/1997 | Fredrickson | 340/572.1 |
| 5,661,458 A | 8/1997 | Page et al. | 340/573 |
| 5,745,037 A | 4/1998 | Guthrie et al. | |
| 5,898,230 A * | 4/1999 | Bartel | 340/5.26 |
| 5,933,098 A * | 8/1999 | Haxton | 340/539 |
| 5,959,533 A | 9/1999 | Layson, Jr. et al. | |
| 5,969,595 A * | 10/1999 | Schipper | 340/539 |
| 6,040,770 A * | 3/2000 | Britton | 340/539 |

FOREIGN PATENT DOCUMENTS

| | | |
|---|---|---|
| EP | 0 344 138 | 11/1989 |
| EP | 0 575 753 | 12/1993 |
| GB | 2 186 404 | 8/1987 |

OTHER PUBLICATIONS

"Code Hopping Encoder Product Brief," *Microchip HCS301*, DS40136A, Microchip Technology Incorporated, Chandler, Arizona, 1996.

* cited by examiner

Primary Examiner—Brian Zimmerman
(74) Attorney, Agent, or Firm—Faegre & Benson LLP

(57) ABSTRACT

An Electronic House Arrest Monitoring (EHAM) system of the present invention includes a transmitter attached to a monitored offender and a receiver positioned in the vicinity of the desired monitoring location. The transmitter and the receiver each have a pattern stored or generated therein for determining the interval of time between signal transmissions and receptions. The pattern is pseudo-random to offer improved protection against imposter transmitters, in other words the time intervals are selected to be unequal and randomly varying but the pattern is repeated or cycled to allow continuing signal transmission by the transmitter. The transmitter transmits signals at varying time intervals according to this pattern, and the receiver authenticates signals it receives as coming from the monitored transmitter based on the expected time intervals from the pattern. The pattern may include any number of time intervals and, in one embodiment, includes more than one subpattern to extend the length of the repeat cycle to increase the difficulty of defeating the monitoring system. As further protection against imposter devices, the receiver may verify the signals based on information unique to the transmitter included in each signal. The receiver may further use the received signals and unique time interval patterns to determine a number of operating states, including New Transmitter ID Received, Transmitter In Range and Locked to Transmitter, Transmitter In Range and Not Locked, Transmitter Out of Range, and Imposter Likely. The monitoring system may also include a remote host computer linked to the receiver or receivers to enable these operating states to be monitored remotely by enforcement personnel.

46 Claims, 9 Drawing Sheets

AUTHENTICATION TECHNIQUES IN A MONITORING SYSTEM

The present invention relates to techniques for authenticating or verifying transmissions from a particular transmitter to a receiver in a monitoring system, and in particular, to an authentication technique in a monitoring system that includes sequential transmissions from the transmitter at varying time intervals that vary in a pattern that is either known or determinable by both the transmitter and the receiver in a manner that enables the receiver to determine that signals it receives are authentic transmissions from the particular transmitter.

BACKGROUND OF THE INVENTION

Monitoring systems in which a receiver monitors the presence or absence of a transmitter in the vicinity of the receiver are known in the art. Such monitoring systems have been used for monitoring persons or things in various applications, including monitoring criminal justice offenders under house arrest, monitoring locations of trucks or rail cars, monitoring movements of wild animals, and the like.

Electronic house arrest monitoring (EHAM) systems allow for monitoring and some limited control of criminal justice system offenders without the much greater expenses associated with incarceration of such offenders. In a typical EHAM system, criminal justice system offenders are under parole or probation requirements to remain at certain locations during specified times. For example, an offender may be ordered to remain at his/her home from 7 p.m. to 7 a.m. on weekdays and all day on weekends. In other words, the offender in this example could be required to be at home at all times other than between 7 a.m. and 7 p.m. on weekdays, but he/she could be allowed to travel to and from work at his/her place of employment during that period away from home.

A typical EHAM system includes a transmitter (sometimes called a "tag") attached in some manner to the offender, such as by a bracelet or band semi-permanently affixed to the wrist or ankle of the offender. A receiver, also known as a field monitoring device (FMD), is centrally located in the offender's home and is provided with or connected to some communication system for communicating with a remote computer or host computer located at a central monitoring facility, where the compliance of the offender with the location and travel restrictions imposed on him or her is monitored. The receiver (FMD) is programmed to flag the presence or the absence of the transmitter, thus also the offender, in the vicinity of the receiver (FMD) based on the reception or the absence of a reception by the receiver (FMD) of signals generated by the transmitter. For example, the receiver (FMD) in the offender's home may be connected to a standard telephone line so that the receiver (FMD) can place calls to or receive calls from the host computer at the central monitoring facility. Alternatively, the receiver (FMD) at the offender's home may communicate with the host computer at the central monitoring facility via a cellular telephone link, a dedicated RF link, a cable television (CATV) link, an optical link, or some other communication link. Wireless communications links are especially useful in more sophisticated systems in which the receiver (FMD) may be mobile and tracked by a tracking or locating system, such as a global positioning satellite (GPS) system, a ground-based RF tower locating system, or the like.

Typically, the transmitter on the person or device being monitored is powered by a battery and transmits a RF signal at intermittent time intervals, which RF signal is detectable and read by the receiver (FMD). Such RF signals from the transmitter are typically not transmitted continuously in order to reduce the power consumed by the transmitter and to conserve power available from the battery. While not continuous, the RF signal transmissions must, at a minimum, be often enough to enable reasonable monitoring of the offender's presence or absence from home or from other places where the offender's presence or absence is being monitored. For example, depending to some extent on remoteness of the place monitored and other circumstances, monitoring may not be effective with RF signal transmissions from the transmitter on the offender that occur only once every ten hours, but transmitting RF signals once every ten seconds may be superfluous for monitoring. At the same time, it is desirable for the transmitter battery to have a sufficiently long life to minimize the amount of time that probation or parole officers spend replacing transmitter batteries, and superfluous transmissions would consume power and shorten transmitter battery life.

The receiver (FMD) includes a RF receiver circuit for receiving the relatively low power transmissions from the transmitter on the offender. Simple loop-type antennas are typically used in the transmitters for cost and weight reasons. Since many antennas, including loop-type antennas, have inherent null points at particular angular directions, it is common for each transmitter to include two antennas oriented differently in relation to the transmitter circuitry to make the transmissions more detectable regardless of angular orientation in relation to the receiver (FMD). The transmitter may also alternate sequential transmissions between the two differently-oriented antennas.

It is desirable to design electronic house arrest monitoring (EHAM) systems so that they are not foiled easily by transmissions from impostor transmitters. For example, there are consumer devices available that have the ability to record and then duplicate transmissions from remote controls for other consumer devices, such as infrared control signal transmissions for audio and video equipment, RF transmissions for garage door openers, remote keyless entry system transmissions for vehicles, and the like. Such devices, also known as code grabbers, may be useful as an all-in-one remote control. While most such code grabbers available to consumers work only in the infrared region or for amplitude-modulated (AM) RF signals, it is conceivable that similar code grabber devices could be constructed to record and duplicate frequency-modulated (FM) RF signals, which may be used in EHAM systems. Such a FM code grabber signal duplicating device could conceivably be used by a confined offender, who is wearing a transmitter, to fool an EHAM system into indicating that the transmitter worn by the offender is still in the vicinity of the receiver (FMD) in the offender's home, when the receiver (FMD) is instead actually receiving duplicated signal transmissions from the FM code grabber signal duplicating device positioned near the receiver (FMD).

At least one attempt has been made to authenticate signal transmissions to ensure that such signal transmissions are sent from a particular transmitter and not from some other source, as disclosed in U.S. Pat. No. 5,032,823. That patented system utilizes a single bit in each transmission bit-string or alternates its state (i.e., from zero to one or vice versa) in consecutive transmissions. Additionally, each transmission is sent at fixed time intervals. Unfortunately, such a system is easily fooled by an impostor transmitter that produces a similar bit in each transmission and which toggles such bit as well. In other words, such a signal transmission authentication scheme is too simple.

It is against this background and with the desire to provide better protection against non-authentic transmissions, i.e., to detect possible imposter transmissions, that the present invention has been developed.

SUMMARY OF THE INVENTION

Accordingly, it is an object of the present invention to provide an improved electronic house arrest monitoring (EHAM) system that provides an improved ability to authenticate received transmissions as having come from a particular transmitter.

It is also an object of the present invention to reduce the possibility of offenders defeating the EHAM system with an impostor transmitter.

It is a further object of the present invention to provide an improved authentication technique in an EHAM system which efficiently uses power supplied by a battery in the transmitter worn by the offender to extend the life of the battery.

Additional objects, advantages, and novel features of this invention shall be set forth in part in the description that follows, and in part will become apparent to those skilled in the art upon examination of the following specification or may be learned by the practice of the invention. The objects and advantages of the invention may be realized and attained by means of the instrumentalities, combinations, and methods particularly pointed out in the appended claims.

To achieve the foregoing and other objects and in accordance with the purposes of the present invention, as embodied and broadly described herein, the present invention is directed to a monitoring system for monitoring the presence or absence of a person or thing to be monitored in a vicinity of a receiver that may be positioned in a place to be monitored or that may be mobile and itself also tracked for location. The monitoring system includes a transmitter, associated with a person or thing to be monitored, which provides signals at time intervals that vary in a pattern that is either known or determinable by the receiver in a manner that enables the receiver to determine that signals it receives are authentic transmissions from the transmitter. As mentioned above, the monitoring system also includes the receiver, also known as a field monitoring device (FMD), associated with a place where the person's or thing's presence or absence is to be monitored, or the receiver (FMD) may also be mobile and tracked by a location tracking system. The receiver (FMD) is operative to receive signals from the transmitter and to determine whether the transmitter is within range of the receiver (FMD). The receiver (FMD) may be further operative to recognize the signals as authentic transmissions from a particular transmitter based upon determination of whether the signals are received at time intervals that vary in the same pattern as such signals are variably transmitted by the particular transmitter. In this regard, the transmitter and the receiver (FMD) may each have the ability to create the same pattern. Further, the receiver (FMD) may measure time intervals between consecutively received signals to determine whether the most recently received signal fits (i.e., has an expected time interval) in the pattern based on such measured time intervals.

To provide improved accuracy in authentication, one embodiment of the monitoring system receives a number of signals over a predetermined period of time prior to authenticating the signal transmissions. More particularly, the receiver (FMD) can authenticate signals as being from a particular transmitter upon receiving as few as two consecutively transmitted signals at time intervals that vary according to the pattern that is known or determinable by both the receiver (FMD) and the particular transmitter. To further improve authentication accuracy and protect against imposter transmitters, the transmitted signal may include information representative of the current position of that transmission in the pattern. The receiver (FMD) may also use this current position information to determine when to expect the next signal reception from the authentic transmitter based on the pattern. To increase the difficulty of an imposter transmitter, the pattern may be a pseudo-random pattern, i.e., a pattern that is not established by readily determined mathematic equation. The pseudo-random pattern may repeat itself periodically to enable the receiver (FMD) and the transmitter to be matched or locked in the same transmission interval pattern. The receiver may be operative to provide an indication of a likelihood of an impostor transmitter. The system may further include a remote host computer, located at a separate, central monitoring facility, that is communicatively linked with the receiver (FMD). The receiver (FMD) may be operative to communicate indications of operational states of the system and to transmit additional messages if events occur, such as the transmitter remaining out of range of the receiver, that change the operational state of the system.

In a further embodiment of the monitoring system, the receiver (FMD) and the transmitter each includes microprocessor circuitry that is configured to selectively utilize one of two or more pseudo-random, time interval generators that establish a time interval pattern for signal transmissions by the transmitter and expected authentic signal receptions by the receiver (FMD). Further, the selection of which of the pseudo-random, time interval generators to be used during a particular time period may be completed by a pseudo-random number generator included in the microprocessors of both the receiver (FMD) and the transmitter. For further protection against the use of potential imposter transmitters, the pseudo-random number generator may be designed to select the time interval generator based on information, such as a predetermined identification code, unique to the particular transmitter. This unique information may be included in the signals transmitted by the transmitter and received by the receiver (FMD). In this manner, the monitoring system may provide significantly improved protection against the manufacture and use of imposter transmitters by increasing the length of time between repeated time interval patterns.

The present invention is also directed to a method of determining that signals received by a receiver (FMD) are authentic transmissions from a particular transmitter. The method includes providing a transmitter that transmits at time intervals which vary in a pattern, providing a receiver (FMD) that receives transmissions from the transmitter, and determining whether transmissions received by the receiver (FMD) follow, or fit into, the same pattern, which is also known or determinable by the receiver independently of the transmission received. Authentication of the transmissions received are based on this determination.

The present invention is also directed to a monitoring system for monitoring the presence or the absence of a person or thing in a vicinity of a place or of an object being monitored. The system includes a transmitter associated with the person or thing being monitored, which transmitter produces and transmits signals at time intervals that vary in a pattern. The system also includes a receiver associated with the place to be monitored, which receiver receives signals and determines if such signals are received at time intervals that vary in the same pattern.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention. In the Drawings.

DETAILED DESCRIPTION OF THE INVENTION

Figure 1:
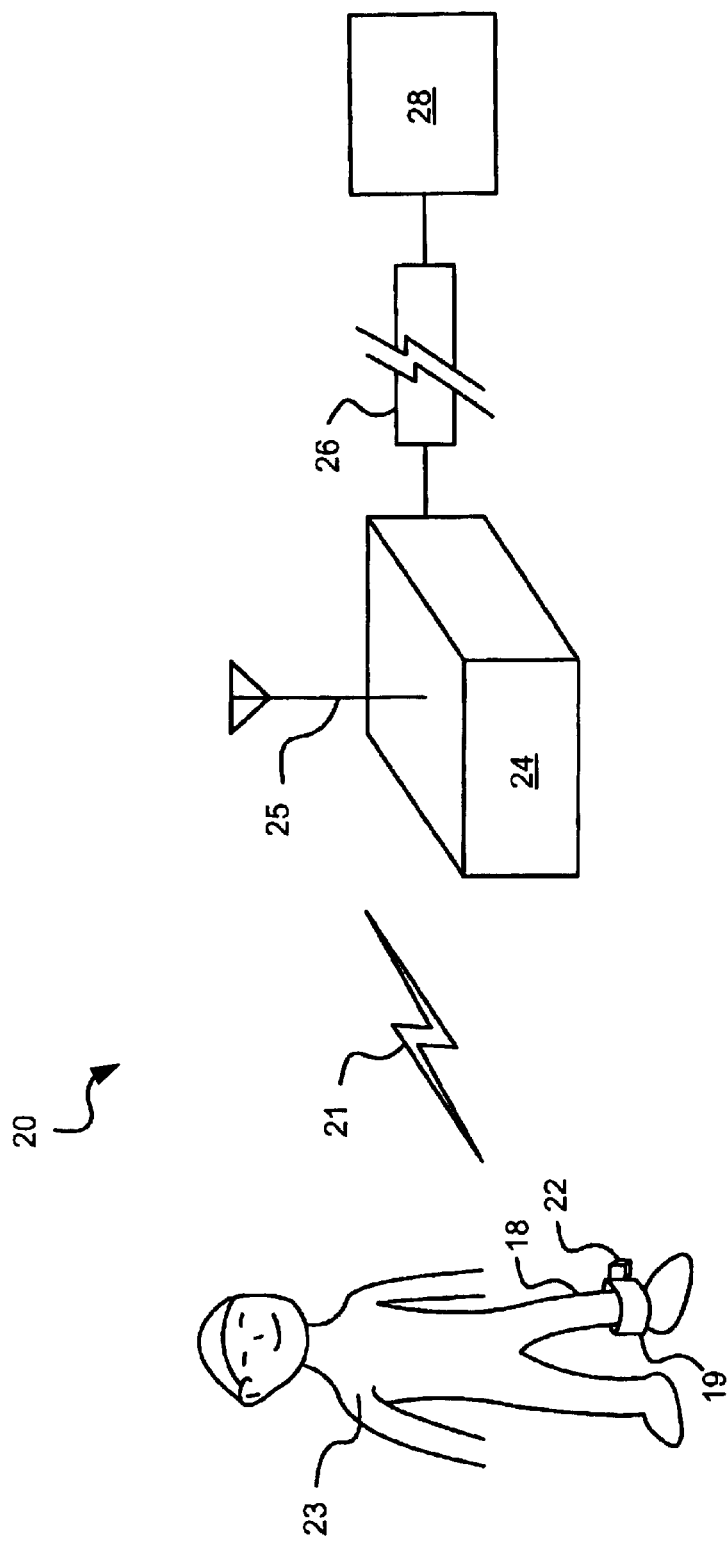
FIG. 1 is in illustration of the major components of the Electronic Home Arrest and Monitoring (EHAM) system of the present invention.

An Electronic Home Arrest Monitoring (EHAM) system 20 in FIG. 1 is shown as an example use of the techniques of the present invention. The EHAM system illustrated in FIG. 1 includes a transmitter 22 that is associated with the location of an offender 23 who is being monitored. For example, the transmitter 22 may be associated with the location of the offender 23 by attaching the transmitter 22 to an appendage of the offender's body with a bracelet or anklet. The transmitter 22 is illustrated in FIG. 1 attached to the ankle 18 of the offender 23 by an anklet strap 19. Suitable tamper detection features may be included with transmitter 22 and anklet strap 19 to detect unauthorized attempts to remove the transmitter 22, but this invention is not directed to any particular tamper detection feature, so further description of such features is not needed to understand this invention. Transmissions 21 from the transmitter 22 are detected by one or more antenna(s) 25 on or connected electrically to a receiver 24, commonly called a Field Monitoring Device (FMD), which receives and processes the signals from the transmitter 22. The receiver (FMD) 24 is connected through a telephone network 26 or other communications system to a remotely-located, host computer unit 28, where a monitoring agency checks from a remote location whether the offender 23 is in proximity (i.e., "in range") to the receiver (FMD) 24. Alternatively, the receiver (FMD) 24 may be only connected intermittently to a communications system, or it may not be connected directly to a communication system at all. For example, the receiver (FMD) 24 could receive, process, and log the transmissions 21 and/or events, i.e., occurrences which result in changes in the operating states of the transmitter 22, as will be discussed in detail below, into a memory device. The logged information can then be downloaded to a host computer unit similar to computer unit 28 in any of a multitude of ways. For example, the logged information could be downloaded onto a memory disk or into a portable computer, which could be mailed or carried to another location and then loaded directly or through a communications link into the host computer unit 28. Such alternate embodiments may be useful, for example, for monitoring persons in very remote areas, where communication links may not be available or reliable and/or allow for redundancy of the communication links. Further information generally on Electronic Home Arrest Monitoring (EHAM) systems, along with transmitters (ankle bracelets), receivers (FMDs), and host computer units can be found in U.S. Pat. Nos. 4,918,432, 4,952,913, 4,952,928, 4,980,671, 5,117,222, 5,146,207, 5,189,395, 5,204,670, 5,255,306, 5,266,944, and 5,369,699, each of which is owned by the assignee of this patent application, and the disclosures of which are hereby incorporated by reference into this patent application.

Figure 2:
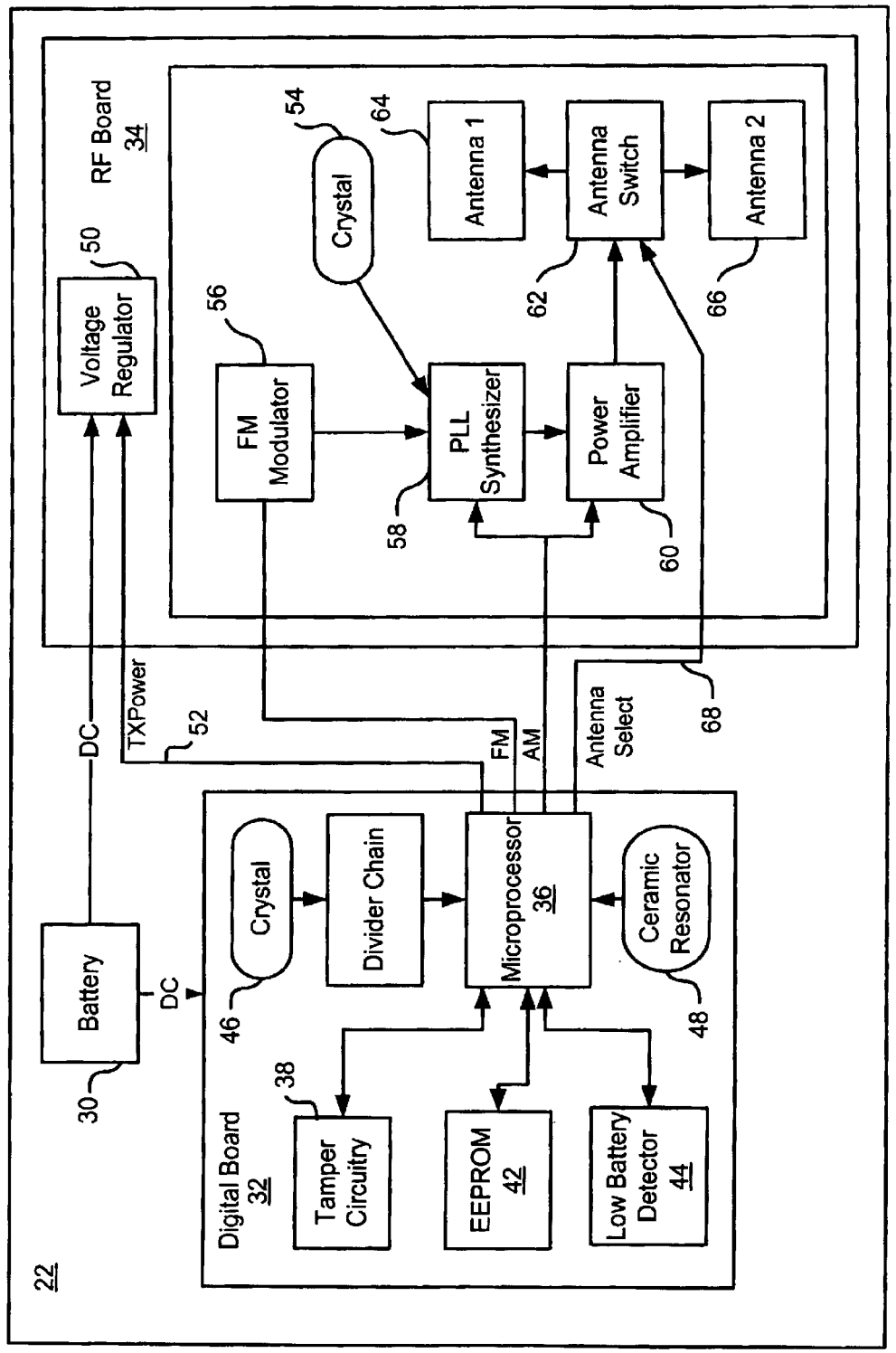
FIG. 2 is a block diagram of a transmitter of the EHAM system of FIG. 1.

A function block diagram of the transmitter 22 is shown in FIG. 2. As can be seen in FIG. 2, the example transmitter 22 has a digital circuit 32, which generates signals relating to status of the transmitter 22 in relation to the offender 23 (FIG. 1), and a RF circuit 34 for transmitting such signals to the receiver (FMD) 24 (FIG. 1). The digital circuit 32 includes tamper circuitry 38, an EEPROM 42 (i.e., an Electrically Erasable Programmable Read Only Memory), and a low battery detector 44, all of which are connected to communicate with a microprocessor 36 linked to the RF circuit 34 for selectively transmitting signals. Timing of the digital circuit 32 for determining time intervals between signal transmissions is provided by a crystal 46, such as a common 32.768 kiloHertz (kHz) crystal, and a ceramic resonator 48. A battery 30 supplies DC power to both the digital circuit 32 and the RF circuit 34.

The RF circuit 34 includes a voltage regulator 50, which receives DC power from the battery 30 and which can be turned on and off via a transmitter power signal 52 from the microprocessor 36. When the transmitter power signal 52 is "on," the voltage regulator 50 supplies regulated DC power to the remaining components of the RF circuit 34, including a crystal 54 for generating a carrier frequency and a FM modulator 56, which receives digital signal inputs from the microprocessor 36 to create FM signals that are indicative of status information generated by the components on the digital circuit 32. This carrier frequency from the crystal 54 and the FM signals from the FM modulator 56 are combined in a phase lock loop (PLL) synthesizer 58, the output of which drives a power amplifier 60 that amplifies the combined carrier frequency and FM signal to a power level suitable for transmission by the antennas 64, 66. The microprocessor 36 also supplies inputs to the PLL synthesizer 58 and the power amplifier 60 for amplitude modulation (AM). The amplified RF signal from the power amplifier 60 is supplied through an antenna switch 62 to one of two antennas 64 and 66 that are oriented differently to increase the likelihood that at least a portion of the signals 21 will be received by antenna 25 on the receiver (FMD) 24. The antenna switch 62 is controlled by an antenna select signal 68 from the microprocessor 36 preferably, but not necessarily, so that alternate sequential transmissions are transmitted through alternating ones of the two antennas 64 and 66. In addition, the microprocessor 36 may be configured to include in each signal transmission a plurality of bits of information, for example, in the range of forty to seventy bits of information that may include a plurality of synchronization bits, identification bits, checksum and error detection bits, low battery indication bits, tamper information bits, mode bits, and the like.

Returning to signal transmission timing, time intervals between consecutive transmissions can be varied for security, identification, and other purposes according to a pattern which is a significant feature of the present invention. The pattern can be set or varied by algorithm, as will be discussed below, or by other well-known methods. The pattern can be, but does not have to be, a pseudo-random pattern of varying time intervals between consecutive transmissions. Pseudo-random in this context means that the time intervals within the pattern are not set by a predictable mathematical equation, but the time interval pattern does repeat after a select number of time intervals, i.e., "pseudo," not completely random. It is also preferable, although not essential, to keep the duration of each such time interval between consecutive transmissions within a known range that has a minimum time duration and a maximum time duration. Reception at receiver (FMD) 24 of consecutive transmissions with time intervals between such transmissions that do not fall within this known range, i.e., a duration that is longer than the maximum or shorter than the minimum,.may be suspected of not being authentic transmissions (i.e., from an imposter transmitter). These transmissions are only "suspect" because another possible reason for a time interval between two received transmissions that is longer than the maximum is that one or more of the transmissions from the authentic transmitter 22 have not been received by the receiver (FMD) 24 due to, for example, interference, shielding, or being at a marginal or outer limit of the transmitter's transmitting power range. In any of these circumstances, further authentication testing procedures are desirable and will be described in more detail below. The minimum for an interval between consecutive transmissions may be set somewhere in a range of, for example, five to thirty or more seconds with the final selection depending, at least in part, on a desire to increase battery 30 life. In this regard, while smaller time intervals may be desirable for continual monitoring purposes, smaller time intervals between transmissions lead to a larger overall number of transmissions and corresponding power usage by the transmitter 22. The maximum timing interval between consecutive transmissions may be set somewhere in a range of, for example, twenty to fifty seconds or several minutes—again, the selection of a maximum timing interval being preferably, but not necessarily, based on some desirable balance of between accurate and effective monitoring on the one hand and increased battery life on the other.

The pseudo-random pattern for the time intervals between signal transmissions may be generated with any of numerous techniques that are known or readily available to persons skilled in the art, such as: (i) by manually encoding of "look up" tables by a programmer for a selected number of intervals; (ii) by the use of a digital, analog, or other number or time generator; (iii) by the microprocessor 36 with the use of flip-flops (or other electronic circuitry), shift registers, logic gates and/or circuits, and number generators; or (iv) by a combination of any number of these or other techniques. In this regard, the important feature of the invention is that both the transmitter 22 and the receiver 24 are configured to know or to be able to determine the same time interval pattern. Therefore, it is not necessary to disclose or provide a particular pseudo-random pattern or computer code to enable persons skilled in the art to practice this invention. In fact, disclosure of a particular pseudo-random pattern or of a specific means for generating a pseudo-random pattern to practice this invention would only serve to defeat the security purposes of an EHAM system 20 that uses such pseudo-random patterns or such means for generating the pseudo-random pattern. Specifically, if the particular code was provided, it would enable defeat of the authentication technique described herein in an EHAM system 20 that uses that particular code, and, with that information, offenders or persons under home arrest may be able to "fool" the EHAM system 20 with an impostor transmitter, thus forcing a user to adopt a different code to practice this invention in a secure manner.

Figure 3:
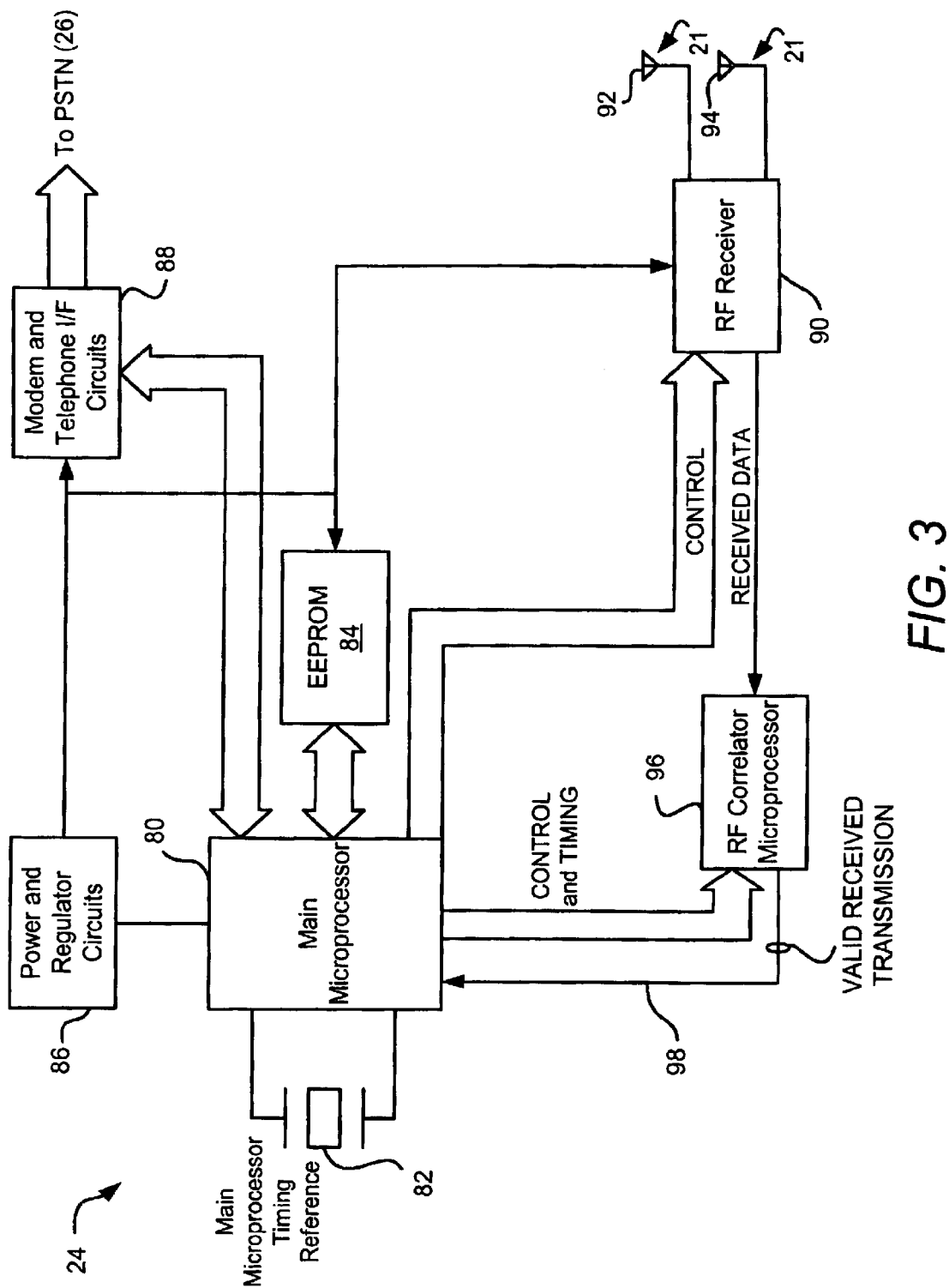
FIG. 3 is a block diagram of a receiver (FMD) of the EHAM system of FIG. 1.

An example receiver (FMD) 24 of the EHAM system 20 is illustrated in FIG. 3 and includes a main microprocessor 80, which can receive timing information from a timing reference 82, such as a standard crystal oscillator. The main microprocessor 80 utilizes information stored in internal ROM (Read Only Memory) and in an EEPROM (Electronically Erasable and Programmable Read Only Memory) 84 for controlling its functions and the functions of other receiver (FMD) 24 components to implement this invention. Power and regulator circuits 86 convert conventional AC power to regulated DC power for the remainder of the components of the receiver (FMD) 24 as is well-known in the art. A conventional modem and telephone interface circuit 88 allows the main microprocessor 80 to communicate with the host computer 28 (FIG. 1) through the public telephone network 26, cellular telephone system, or any other communication system. A conventional RF receiver circuit 90 has preferably, but not necessarily, two antennas 92 and 94 and may be controlled by the main microprocessor 80.

The RF receiver circuit 90 provides its received signals to a RF correlator microprocessor 96, which receives control and timing information from the main microprocessor 80 and reports data back to the main microprocessor 80 in the form of a valid received transmission signal 98. The two antennas 92 and 94 are spaced physically apart from each other to reduce multipathing. Because of the phase differences between signals received simultaneously along different signal paths between the transmitter 22 (FIG. 1) and receiver 24, the exact physical location of the antennas 92, 94 may affect the quality of signals received. For this reason, one of the two antennas 92, 94 is used for a preset time period, e.g., forty seconds, and then the other of the two antennas 92, 94 is used for a similar time period. Once the transmitter is "found" by the receiver 24 with a particular one of the antennas 92, 94, the receiver 24 will stay with that particular antenna 92, 94 until no valid signal is received for a preset period of time, such as forty seconds.

The RF receiver circuit 90 passes all received data (e.g., data contained in signals transmitted by the transmitter 22, FIG. 1) to the RF correlator microprocessor 96, which synchronizes the received bits of information from the RF receiver circuit 90 so as to clean up the signal and reconstruct the timing of the received signals. The RF correlator microprocessor 96 verifies that the data stream contains correct data, then it passes the data stream to the main microprocessor 80. The main microprocessor 80 verifies that the data or message received from the RF correlator microprocessor 96 has the correct identification and then performs the check of the timing intervals between consecutive transmissions to authenticate the transmissions. The main microprocessor 80 is preferably programmed or set up to duplicate the pseudo-random pattern of timing intervals between consecutive transmissions via a similar approach as with the transmitter 22 (FIG. 1). In this manner, the receiver (FMD) 24 has the same pseudo-random pattern and can be operated to determine if received transmissions fit within the pattern, i.e., did the consecutively received transmissions have the time intervals between them that are expected according to the pattern.

Figure 4:
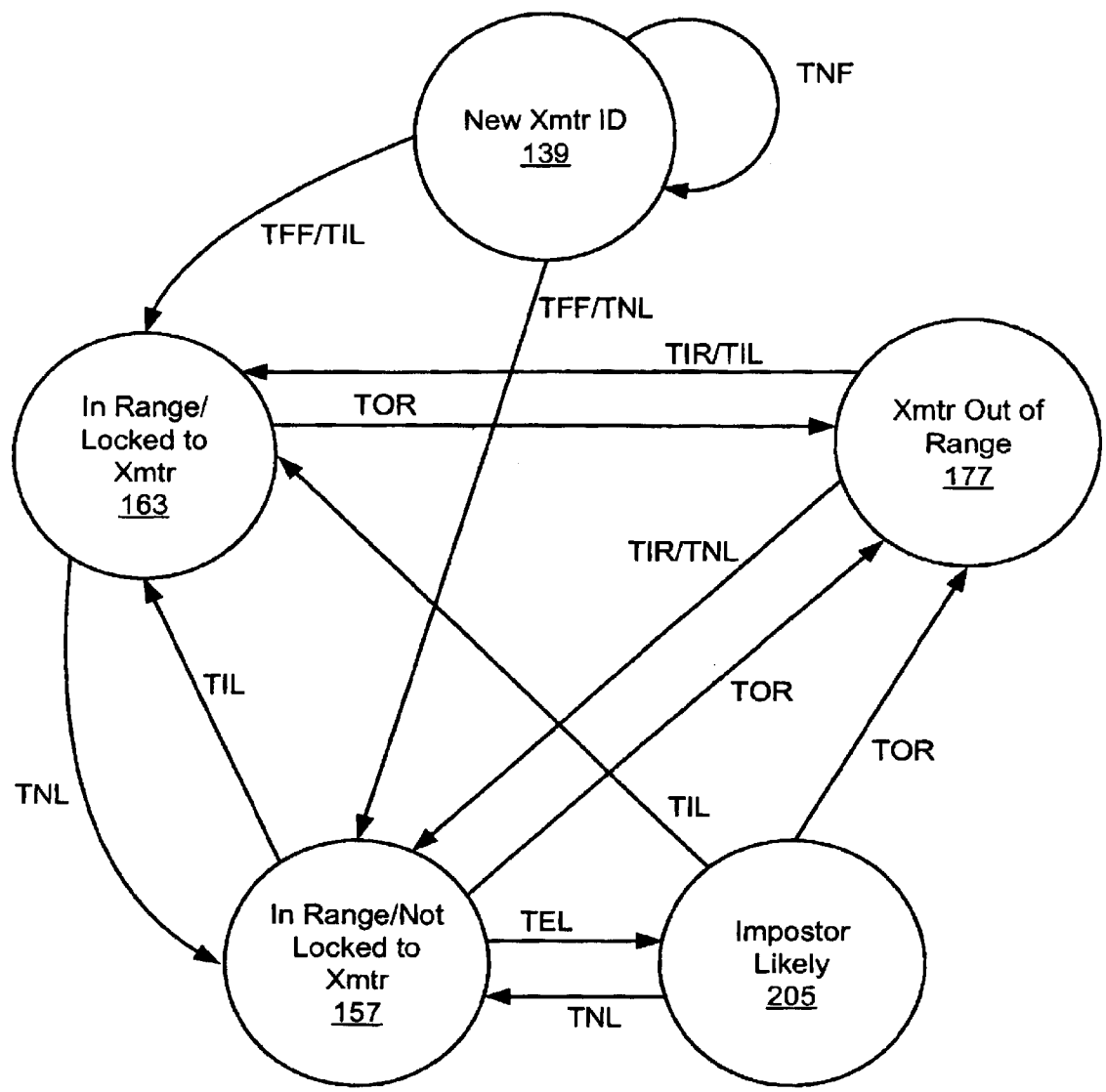
FIG. 4 is a state diagram of five states between which the EHAM system of FIG. 1 may transition.

Based upon the above determinations and other information included in the transmissions received and processed by the main microprocessor 80, the main microprocessor 80 can set any of a number of different flags (e.g., "on/off" indicators included by a programmer in EEPROM and/or RAM of the receiver (FMD) 24) to an on or off state. These flags can then be utilized by the main microprocessor 80 to determine what operating state the transmitter 22 is currently in (explained in more detail below) and whether a message or messages should be transmitted immediately to the remote host computer 28 or whether the messages can be logged for later transmission to the remote host computer 28. For example, but not as a limitation, these messages may include Transmitter Not Found (TNF), Transmitter First Found (TFF), Transmitter In Range (TIR), Transmitter Out Of Range (TOR), Transmitter In Lock (TIL), Transmitter Not Locked (TNL), and Transmitter Error Lock (TEL) as shown in FIG. 4. As noted above, the main microprocessor 80 preferably is programmed to log, i.e., store in memory, these messages for periodic transmission and for transmission when an event causes the operating state of the transmitter 22 to be altered, such as when an imposter transmitter is detected by the receiver (FMD) 24.

While the designations for these messages are intended to be self-explanatory, it may be helpful to provide a more detailed explanation of each message. Each transmitter 22 (FIG. 1) has a unique identification. When such a transmitter 22 is attached to an offender 23 and activated, the host computer unit 28 is programmed by an operator with the information that the particular offender 23 is being monitored with that particular identified transmitter 22 and by a particular receiver (FMD) 24. In other words, the offender 23 must be in proximity (i.e., in range) of the receiver (FMD) 24 at prescribed times. The receiver (FMD) 24 can be positioned at a fixed location, such as at the offender's 23 home or work place, and can be accessible by a hardwired telephone line 26 at such location. Alternatively, the receiver (FMD) 24 can be a portable device with a cellular telephone or RF communications link 26 to the host computer 28 and coupled with a location tracking system, such as global satellite positioning (GPS) system, a system comprising a plurality of fixed base position signal transmitting towers, or the like, or the receiver (FMD) 24 may only be intermittently connected communicatively to the remote host computer 28 or may download any logged information directly or indirectly to a portable computer, memory disk, or other medium for subsequent loading into the host computer unit 28. The host computer unit 28 then sends the identification of the newly activated transmitter 22 to the receiver (FMD) 24 via the public telephone or other suitable communications link 26. The microprocessor 80 in the receiver (FMD) 24 then starts to look for transmissions 21 from that newly activated and identified transmitter 22. If no valid transmissions 21 from that newly activated and identified transmitter 22 are received by the receiver (FMD) 24 within a certain period of time, such as five minutes, after the microprocessor 80 gets the new transmitter 22 identification from the host computer unit 28, the microprocessor 80 sets the Transmitter Not Found (TNF) flag and logs a TNF message. Initially (i.e., prior to "lock," explained below), a valid transmission 21 is a transmission having at least the transmitter 22 identification information. The Transmitter First Found (TFF) flag is generated and a TFF message logged by the microprocessor 80 (FIG. 3) when the receiver (FMD) 24 first receives a threshold number of valid transmissions 21 at valid time intervals (i.e., while not in lock, time intervals greater than or equal to the predetermined minimum time interval and for further imposter protection, a time interval falling on a preselected incremental unit of time, such as a one-second increment, a two-seconds increment, or the like) from that particular transmitter 22 after receiving the identification of that transmitter 22 from the host computer unit 28.

The Transmitter In Range (TIR) flag is set and a TIR message logged when the receiver (FMD) 24 has received a threshold number of valid transmissions 21 at valid time intervals (i.e., while in lock, time intervals that follow the transmission time interval pattern known or determinable and expected by the receiver 24 and if not in lock, then as discussed above) from the identified transmitter 22 within a certain time period, which indicate that the transmitter 22 on the offender 23 is close enough to the receiver (FMD) 24 for adequate reception of the transmissions 21. This TIR message indicates, therefore, that the offender 23 is in the proximity of the receiver (FMD) 24, subject to further verification, as will be described below. On the other hand, whenever valid transmissions 21 from a particular identified transmitter 22 are not received for a certain time period, i.e., any selected time period, for example, but not as a limitation, ten minutes, then the microprocessor 80 sets the Transmitter Out of Range (TOR) flag and logs a TOR message to indicate that the identified transmitter 22, thus the offender 23 to whom that identified transmitter 22 is attached, is probably far enough away from the receiver (FMD) 24 that presence of the offender 23 at that location cannot be monitored. This time period can be set readily by an operator of the monitoring system 20, or it can even be set automatically and/or reset periodically by the receiver (FMD) 24 or host computer 28. Such a condition would be reported to the law enforcement agency that is responsible for monitoring the whereabouts of the offender 23, so someone from the agency can contact or go out and find the offender 23.

When the transmitter 22 is identified and within range of the receiver (FMD) 24 and the receiver (FMD) 24 is receiving valid transmissions from the identified transmitter 22 as described, further authentication testing is done to be sure the transmissions 21 are accurate and not emanating from an imposter transmitter. As will be discussed in further detail below, this further authentication enables the receiver (FMD) 24 to set the Transmitter In Lock (TIL), Transmitter Not Locked (TNL), or Transmitter Error Lock (TEL) flags and to log corresponding TIL, TNL, or TEL messages based, generally, on whether the received transmissions 21 are following (i.e., the transmitter 22 and the receiver (FMD) 24 are locked) the time interval pattern that is known or determined by the transmitter 22 and that is known or determined and expected by the receiver 24.

Based on the settings of the various flags, the main microprocessor 80 of the receiver 24 (FIG. 3) determines the EHAM system 20 to be in a particular operating state, such as in one of the five following different states shown in FIG. 4: (a) New Transmitter ID Received 139; (b) Transmitter In Range and Locked To Transmitter 163; (c) Transmitter In Range but Not Locked To Transmitter 157; (d) Transmitter Out Of Range 177; and (e) Impostor Likely 205. The definitions for the conditions under which each of these flags are set, and corresponding messages are logged, and the processing of each of these states by the microprocessor 80 will now be further described.

Figure 5:
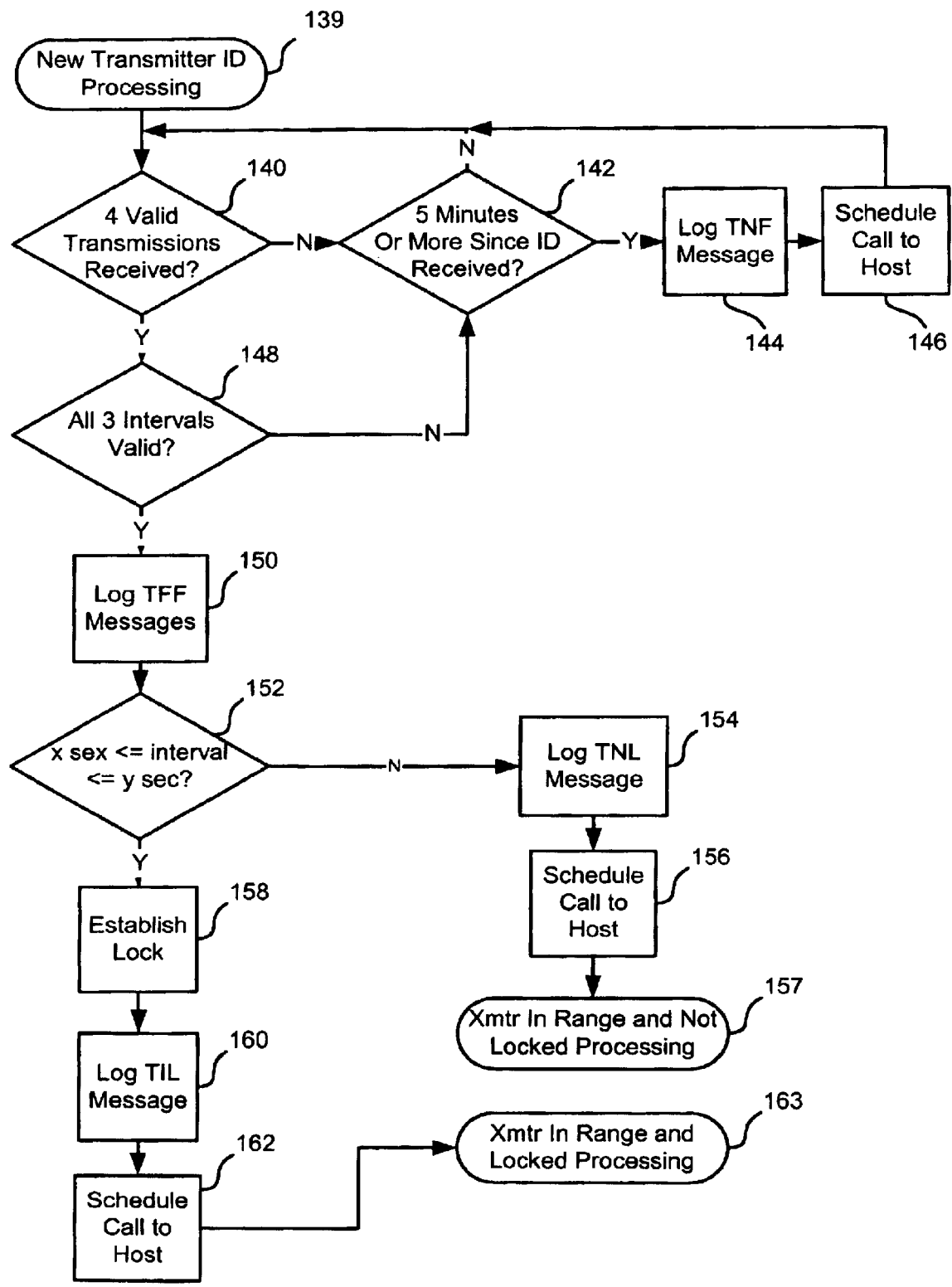
FIG. 5 is a flow chart of receiver (FMD) processing in the New Transmitter ID state.

Beginning for convenience with the activation of a new transmitter 22 on an offender 23, as explained above, processing begins in the New Transmitter ID operating state 139, as shown in FIG. 5. With continuing general reference to FIGS. 1–3 as well as specific reference to FIGS. 4 and 5, this New Transmitter ID operating state 139 is entered only when the receiver (FMD) 24 receives a new transmitter 22 identification from the host computer unit 28 via the public telephone, cellular telephone, or other communications link 26. After receipt of this new transmitter 22 identification, the microprocessor 80 determines at test 140 in FIG. 5 whether a specific number of, such as four, valid transmissions 21 from the new transmitter 22 have been received by the receiver (FMD) 24. A valid transmission 21 for purposes of this test 140 is any transmission 21 which contains the matching identification code and, optionally, other verifiable information, such as a correct preamble and a correct checksum code, which the new transmitter 22 is programmed to send.

An optional, additional criteria for a valid transmission 21 may also require received transmissions 21 to fall on a specific incremental unit of time, such as a one-second increment, a two-seconds increment, or the like, as measured by receiver (FMD) 24. Any incremental unit of time, regardless of how measured, including milliseconds, microseconds, fractions, whole seconds, microprocessor clock time units, or whatever, can be used for this optional, additional valid transmission criteria.

If the specific number of valid transmissions 21 is not received, then a test 142 is performed by microprocessor 80 to determine whether a preset time threshold, for example, five minutes or more, has passed since the new transmitter 22 identification was received by the receiver (FMD) 24 from the host computer unit 28. If not, then processing returns to the previous transmission validation test 140 in which the microprocessor 80 looks again for reception of the four valid transmissions 21 (according to this example) from the new transmitter 22. If it has been such five minutes or more since the new transmitter 22 identification was received by the receiver (FMD) 24 from the host computer unit 28, then the microprocessor 80 sets the Transmitter Not Found (TNF) flag and logs a TNF message, as indicated at 144, and a call, i.e., a transmission of all currently logged but not yet transmitted messages, to the host computer unit 28 is scheduled 146.

The processing then returns to the test 140 to check again for reception of four valid transmissions 21. When four valid transmissions 21 have been received, e.g., matching identification code, correct preamble, and correct checksum in each of four successive transmissions 21 as described above, then a test 148 is performed to determine if all three time intervals between the respective four transmissions 21 were valid. If the option of incremental time unit criteria is used for validating transmissions 21, as described above, then valid time intervals for purposes of test 148 means that the duration of each time interval between successive transmissions 21 is an integer multiple of whatever base timing increment is used by the transmitter 22 in timing transmissions 21 and is greater than a minimum time interval that the transmitter 22 is capable or set to provide between transmissions 21. For example, if the base timing increment used by the transmitter is one (1) second, an actual valid time interval will be an integer multiple of one second, such as perhaps five (5) seconds or forty (40) seconds or whatever. Further, if the transmitter 22 is programmed to produce transmissions 21 at intervals only between, for example, five (5) seconds and sixty (60) seconds, the minimum time interval for test 148 would be five (5) seconds. Therefore, if the transmitter 22 produces transmissions 21 only at time intervals between a minimum of five (5) seconds and a maximum of sixty (60) seconds according to this example and further uses a one-second base timing increment for timing transmissions 21, reception of successive transmissions 21 at the receiver (FMD) 24 with a time interval between the received transmissions 21 having a duration that is an integer multiple of one (1) second, such as ten (10) seconds, i.e., 1 sec.×10=10 sec., that time interval 40 would be valid for purposes of this test 148.

On the other hand, reception of successive transmissions 21 with a time interval duration between such transmissions 21 of, for example, 10.5 seconds would not be valid under the test 148 example described above, because it would not have been transmitted by the transmitter 22 as the transmitter 22 is described above for this example, i.e., not an integer multiple of one (1) second, even though the 10.5-second interval is greater than the minimum five (5) seconds.

Further, a time interval of, for example, four (4) seconds between successive transmissions 21 received by receiver (FMD) 24 would also not be valid under test 148 for the example described above, even though such 4-second interval is an integer multiple of one (1) second, because it is less than the 5-second minimum interval of that example.

If any of the three time intervals is found to be not valid under test 148, then processing goes back to the test 142 to determine if it has been five minutes or more in this New Transmitter ID operating state and continues from there as shown in FIG. 5 and described above.

Figure 6:
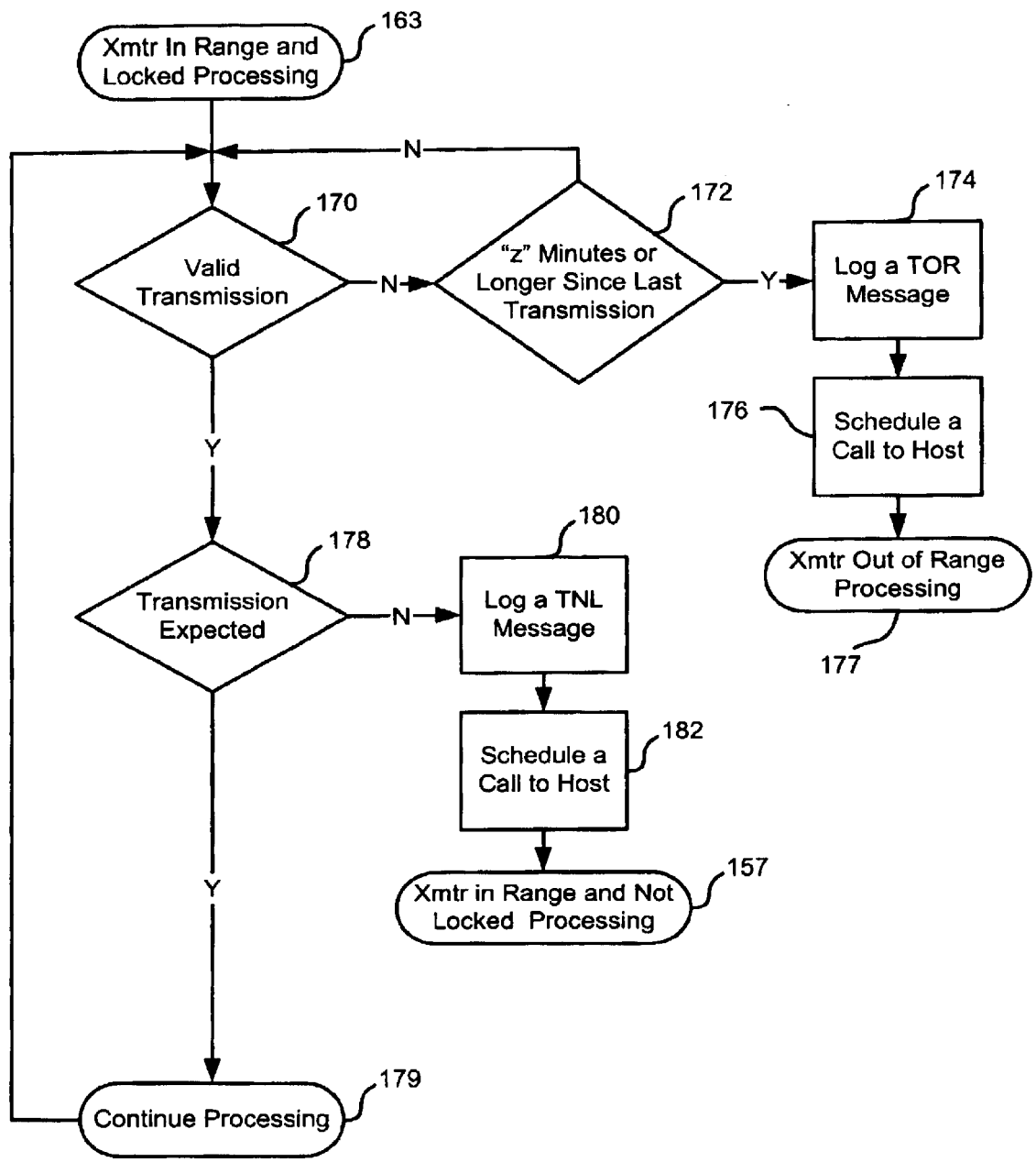
FIG. 6 is a flow chart of receiver (FMD) processing in the Transmitter In Range and Locked state.
Figure 7:
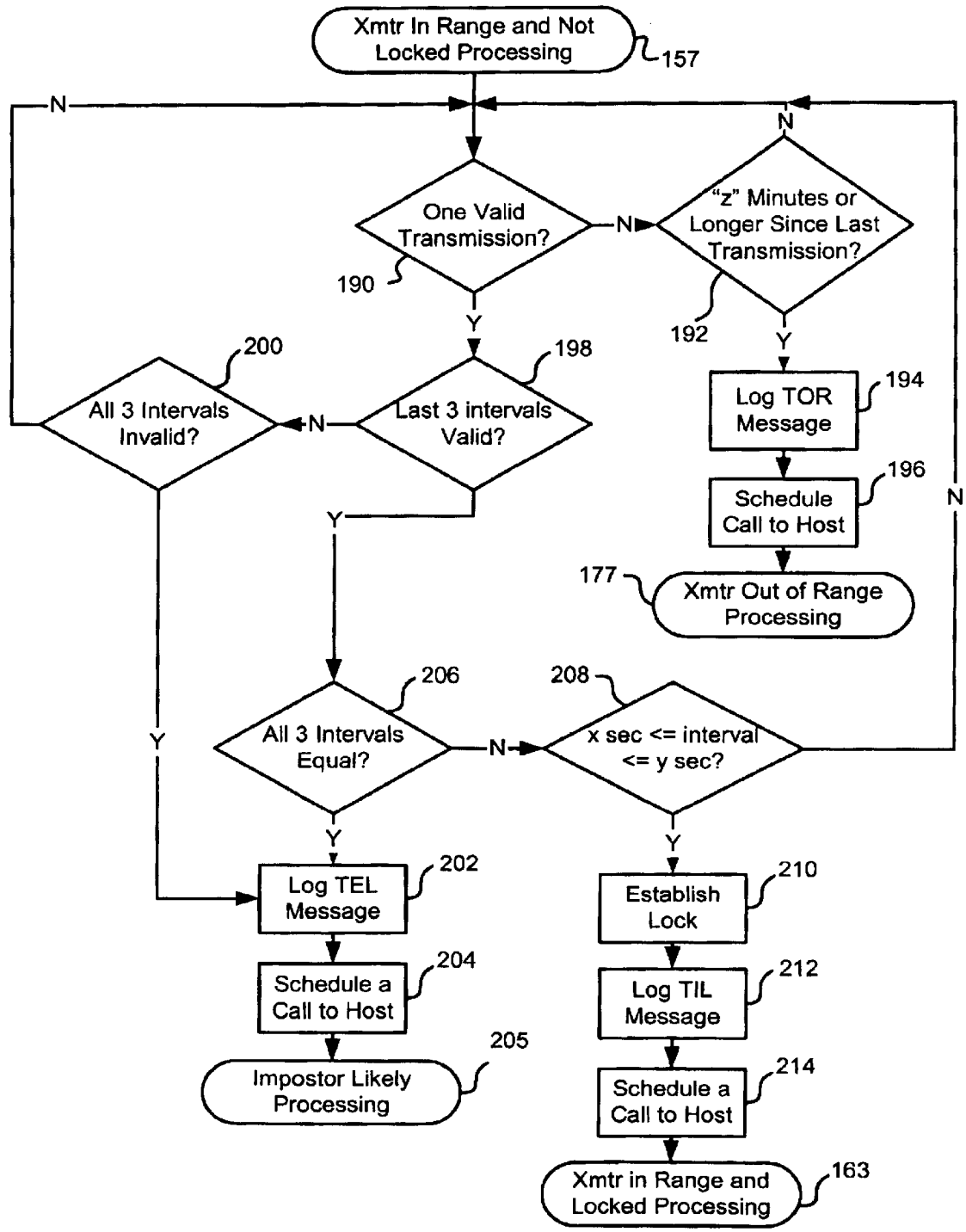
FIG. 7 is a flow chart of receiver (FMD) processing in the Transmitter In Range and Not Locked state.

However, if all three of the timing intervals are valid under test 148, then the Transmitter First Found (TFF) flag is set and a TFF message is logged, as indicated at 150. With the Transmitter First Found (TFF) flag set, a further validation test 152 is performed to determine if the duration of at least one of the timing intervals falls between the preset minimum limit and the preset maximum limit for timing interval duration, which, in the example above, would be the 5-second minimum time interval and the 60-second maximum time interval. As mentioned above, the minimum and maximum time intervals between successive transmissions 21 may be a physical limitation of the transmitter 22 or such preset minimum and maximum limits may correspond to limits of time interval durations programmed into the transmitter 22. For example, the transmitter 22 may be programmed to generate and transmit successive transmissions 21 with intervening time intervals that vary, but that never fall outside of the range between the minimum and maximum limits, such as the 5-second minimum duration limit and the 60-second maximum duration limit of the example above. If none of the three time intervals between successive transmissions 21 received by the receiver (FMD) 24 is between the minimum limit and the maximum limit (i.e., all three time intervals are greater than the maximum limit), then the Transmitter Not Locked (TNL) flag is set and a TNL message is logged, as shown at 154, because the indication of not meeting this test 152 is that the receiver (FMD) 24 may not be receiving all the transmissions 21. A call to the host computer unit 28 is scheduled at 156 to transmit the logged TFF and TNL messages, and processing then transitions to the Transmitter In Range and Not Locked operating state 157 (FIGS. 4 and 7). On the other hand, if at least one of the three time intervals is between the minimum and maximum duration limits of test 152, then lock is established as shown at 158. Once lock 158 is established, then the Transmitter In Lock (TIL) flag is set and a TIL message is logged at 160, and a call to the host computer unit 28 is scheduled 162 to transmit the logged TFF and TIL messages. Processing then transitions to the Transmitter In Range and Locked operating state 163 (FIGS. 4 and 6), in which normal monitoring of the offender's location continues to be verified until something interrupts or interferes with reception of the transmissions 21.

Having established a lock on reception of transmissions 21, as described above, the microprocessor 80 continues with its normal monitoring of such transmissions 21, which shows that the transmitter 22, thus also the offender 23, is remaining in proximity to the receiver (FMD) 24, as the offender 23 is supposed to be. Such processing of transmissions 21 in the Transmitter In Range and Locked operating state 163 shown in FIG. 6 continues by first performing a test 170 on each transmission 21 received at the receiver (FMD) 24 to be sure each successive new transmission 21 received by the receiver (FMD) 24 continues to be valid, i.e., contains the matching identification, has the correct preamble, and has the correct checksum as described above. If not valid, that transmission 21 is considered to be invalid, and that transmission 21 is discarded. If a transmission 21 received by receiver (FMD) 24 is not valid according to this test 170, it is discarded. At the same time, a test 172 is performed to determine if some threshold period of time, such as, for example, ten minutes, has passed since the last valid transmission 21. This threshold period of time can be any length chosen arbitrarily such that the lack of valid transmissions 21 for that period, such as the ten minutes of the example above, indicates the transmitter 22, thus also the offender 23, have probably gone out of range of the receiver (FMD) 24. It could also indicate that the transmitter 22 has stopped transmitting or that it has been shielded. Regardless of the cause for the excessive lapse of time, e.g., ten minutes, since the last valid transmission 21, the microprocessor 80 will report such a lapse to the host computer unit 28 with a Transmitter Out of Range (TOR) message, see FIG. 4.

Figure 9:
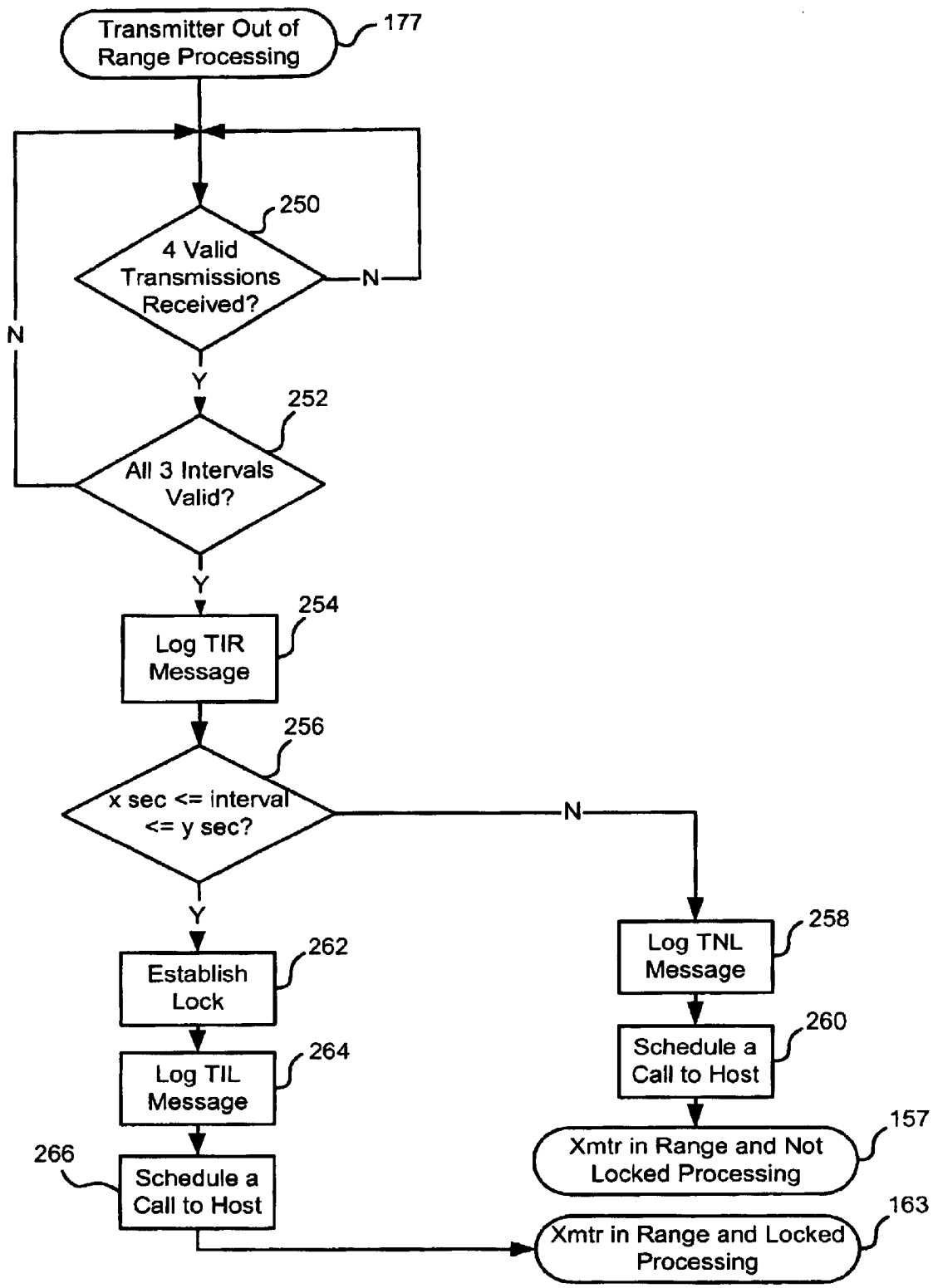
FIG. 9 is a flow chart of receiver (FMD) processing in the Transmitter Out of Range state.

On the other hand, if this threshold time period, e.g., ten minutes, has not passed, a valid transmission 21 from transmitter 22 may still be forthcoming. Therefore, if the test 172 in FIG. 6 shows that the threshold time period, e.g., ten minutes, has not passed, processing returns to the previously described test 170 to simply run the test 170 on the next new transmission 21 received by the receiver (FMD) 24 to determine if it meets the validity criteria of test 170, as described above. If, however, the threshold time, e.g., ten minutes, or more has passed, then the Transmitter Out of Range (TOR) flag is set and a TOR message is logged 174, a call to the host computer unit 28 is scheduled at 176 to transmit the TOR message, and processing is then transferred to the Transmitter Out of Range operating state 177, as shown in FIGS. 4 and 9.

According to a significant feature of the present invention, if the test 170 determines that the transmission 21 received does meet the validity criteria described above, then a further test 178 is performed to determine if the valid transmission 21 received by the receiver (FMD) 24 was received at an expected time, which can be predicted from the time interval pattern that is programmed into, known by, and/or determinable by both the transmitter 22 and the receiver (FMD) 24, as discussed above. In other words, the transmitter 22 is operable to transmit at time intervals that are integer multiples of a base time unit and that vary according to the pattern that is known or determinable by the transmitter 22 and that also fall within the specified minimum time interval limit and maximum time interval limit. The receiver (FMD) 24 also knows or has the capability of determining the same pattern independent of actual transmissions 21 received. (Independent, for purposes of this invention, means that the receiver (FMD) 24 can determine the time interval pattern used by the transmitter 22 in some way other than merely monitoring time intervals between received signals 21.) Then, knowing the last valid time interval, which is unique within the pattern, and knowing or determining the pattern, including the time durations of the next intervals to come in the pattern, the microprocessor 80 in the receiver (FMD) 24 can determine when to expect each successive following valid transmissions 21 to be received according to this pattern. Therefore, the microprocessor 80 can run the test 178 to determine whether that expectation is met for the next transmission 21 received by receiver (FMD) 24 and for each transmission 21 received while in the Transmitter In Range and Locked operating state 163, regardless of whether one or more of such transmissions 21 do not get received for any reason. In this manner, the monitoring system 20 minimizes false out-of-range alarms, and corresponding costs, by being able to remain in the Transmitter In Range (TIR) and Locked operating state 163 for a given amount of time (see test 172) even when one or more of the transmissions 21 are not received, thereby providing an improvement over prior art devices that typically transmit false alarms when as few as one expected signal is not received.

As discussed above, the receiver (FMD) 24 is operable to use the two most recently received valid transmissions 21 that fell within the minimum and maximum time interval limits to locate the position within the pattern that the transmitter 22 is transmitting. As an illustration, if the pattern had only three time intervals of five (5), seven (7), and nine (9) seconds (an actual pattern would probably, but not necessarily, have many more intervals) and the most recent interval was seven (7) seconds, the receiver (FMD) 24, knowing or determining the pattern, would expect the next transmission 21 to occur when another nine (9) seconds have passed and further, would expect that another transmission 21 would then occur when another five (5) seconds have passed. From this simple example, it is clear that it is preferable that a larger number of time intervals are included in the pattern to minimize repeating of the pattern in order to provide more security. Further, the use of more than one pattern may be preferable, but not essential, according to the present invention, with selection of which pattern to use being controlled by the transmitter 22 with a number generator or similar device (e.g., but not for limitation, a flip-flop circuit).

Further security against imposter transmitters may be provided by basing the selection of which pattern or pattern generator (i.e., firmware employing algorithms, shift registers, logic gates, and the like) to employ being based on selection information, such as transmitter identification codes and internal counters unique to each transmitter 22, being passed along to the receiver (FMD) 24 from the transmitter 22, or being performed by a separate pseudo-random number generator or algorithm. The introduction into the monitoring system 20 of an additional number generator to select the pseudo-number generator to create each pseudo-random time interval pattern significantly extends the repeating time interval pattern (i.e., cycle time) of the monitoring system 20. The combination of this extended cycle time with unique transmitter identification information can provide increased security to the monitoring system 20 of the present invention, because an impostor would be forced to successfully intercept (e.g., without missing a single transmission) and decipher the information over a much longer period. Again, the length of such an extended cycle time could be selected to balance battery life, cost of the monitoring system 20, size of the monitoring system 20 components, and other hardware and firmware considerations. For example, in one preferred embodiment of the present invention, the extended cycle time is accomplished with the use of two pseudo-random number generators to generate pseudo-random time interval patterns and one pseudo-random number generator to determine the order of use of the two time interval pattern generators.

As discussed above, the exact number of time intervals in each time interval pattern, the repeating order of the time interval generators, and the length of the extended cycle time are matters of user choice, once the principles of this invention, specifically including the feature of providing a transmitter 22 and a receiver 24 that are configured to transmit and receive, respectively, signals 21 according to a time interval pattern known or determinable by each device, is understood. Thus, each of these parameters may have any number of arbitrary, planned, formulaic, or quasi-random values that will enable successful practice of the invention, and no enablement or best mode purposes would be served by specifying any particular values or formulae for providing such values. In fact, disclosure of such details chosen by a particular user or manufacturer could enable defeat of the security purposes and functions of the monitoring system 20 of the present invention, thus would not serve any useful purpose.

Referring again to FIG. 6, if the test 178 determines that the transmission 21 was transmitted and received at the expected time according to the time interval pattern, as described above, then the receiver (FMD) 24 remains locked to transmissions 21 from the transmitter 22 and processing in this state continues at 179 by returning again to test 170 for the next new transmission 21 received by the receiver (FMD) 24.

If the valid transmission 21 is received at an unexpected time (i.e., not following the time interval pattern), the indication would be that the valid transmission 21 could be an imposter (i.e., a transmitting device that can transmit valid transmissions 21, but not at time intervals that follow the correct time interval pattern being used). Significantly, though, since both transmitter 22 and receiver (FMD) 24 maintain identical timelines, merely missing or losing a number of transmissions 21 does not change the state of the monitoring system 20 from the Transmitter In Range and Locked operating state 163. However, when valid transmissions 21 are received at unexpected times, the receiver (FMD) 24 would no longer be considered locked onto valid transmissions 21 from the transmitter 22, and microprocessor 80 will report such condition to the host computer unit 28 with a TNL message. Therefore, when a valid transmission 21 from test 170 is received at a time that is not expected under test 178, as described above, the Transmitter Not Locked (TNL) flag is set and a TNL message logged at 180, a call to the host computer unit 28 is scheduled at 182 to transmit the TNL message, and the processing is then transferred to the Transmitter In Range and Not Locked operating state 157 as shown in FIGS. 4 and 6, which instigates processing for operating state 157 as is shown in more detail in FIG. 7.

Processing by microprocessor 80 for the Transmitter In Range and Not Locked operating state 157 transitioned from either FIG. 5 (New Transmitter ID operating state) or FIG. 6 (Transmitter In Range and Locked operating state), as described above, continues as illustrated in FIG. 7 until microprocessor 80 determines (i) the transmitter 22 is out of range 177, (ii) the transmitter 22 is in range and locked 163, or (iii) the transmissions being received by receiver (FMD) 24 are likely being transmitted by an imposter transmitter device 205. Referring to FIG. 7, therefore, the first test 190 is similar to test 170 in FIG. 6 and is used to determine whether the most recent transmission 21 received is valid. If the most recently received transmission 21 is not valid, test 192 determines whether any valid transmissions 21 have been received within a predetermined time window, such as ten minutes. This test 192 is similar to the test 172 in the Transmitter In Range and Locked operating state 163 of FIG. 6. Again, "valid" for purposes of this test 190, as in test 140 of the New Transmitter ID process 139, means that each transmission 21 contains the identification code and, if included, the correct preamble and the correct checksum. If test 192 is run and determines the predetermined time threshold, such as ten minutes, has elapsed since the last valid transmission 21, the Transmitter Out of Range (TOR) flag is set and a TOR message is logged 194, a call to the host computer unit 28 is scheduled 196 to transmit the TOR message, and processing is then transferred to the Transmitter Out of Range operating state 177, transfer shown in FIGS. 4 and 7 and processing steps shown in more detail FIG. 9.

However, if the predetermined threshold time, e.g., ten minutes, has not passed since the last valid transmission 21, i.e., the transmitter 22 may still be in range relative to the receiver (FMD) 24, then microprocessor 80 returns processing to the previously stated test 190 to look for a valid transmission 21. On the other hand, if the previously-mentioned test 190 determines that a valid transmission 21 has been received, then a further test 198 is performed to determine if the time intervals among the newly received valid transmission 21 and the three preceding, valid transmissions 21 are valid (i.e., are integer multiples of the base timing increment, such as the 1-second base timing increments in the example described above, and are greater than the minimum time interval limit, as described above for the test 148 in the New Transmitter ID operating state 139 shown in FIG. 5). If all three intervals are not valid, then microprocessor 80 performs a test 200 to determine whether all three of the intervals between the four most recently received, valid transmissions 21 are invalid. If one or more of the three intervals are valid, then microprocessor 80 returns processing to the previously mentioned test 190 to continue checking for a valid transmission 21 within the predetermined time window, e.g., ten minutes, as described above. If, however, all three of the intervals were invalid, an imposter transmitter is presumed and the Transmitter Error Lock (TEL) flag is set and a TEL message is logged at 202, and a call to the host computer unit 28 is scheduled at 204 to send the TEL message to notify the host computer 28 that there may be an imposter transmitter in the vicinity of the receiver (FMD) 24. An imposter transmitter is presumed at this point, because the reception of four valid transmissions 21, i.e., with, for example, matching identification codes, correct preamble, and correct checksum, but with all three time intervals between the four valid transmissions 21 being invalid, i.e., not integer multiples of the base timing increment and greater than the minimum time interval limit, would be highly unlikely from an authentic transmitter 21. After scheduling the call to the host computer unit 28 to relay the TEL or "imposter likely" message, microprocessor 80 then continues processing in the Imposter Transmitter Likely operating state 205 shown in FIGS. 4 and 8 until the transmitter 22 is determined to be either out of range 177, in range and not locked 157, or in range and locked 163, as described below.

Alternatively, if the test 198 determines that all three intervals were valid, a test 206 is then performed to determine if all of the three time intervals between the last four transmissions are equal, which is not likely from an authentic transmitter 22, because authentic transmitters 22 are set according to this invention to transmit valid transmissions 21 at varying time intervals according to a pseudo-random pattern. Thus, four valid transmissions 21 with three valid time intervals that are all equal would be suspicious and would possibly be coming from an imposter transmitter. A Transmitter Error Lock (TEL) flag is set and a TEL message is logged at 202, a call to the host computer 28 is scheduled at 204 to transmit the logged TEL message, and processing is continued in the Transmitter Impostor Likely operating state 205, as will be described in more detail below. If the four valid transmissions 21 have three valid, but unequal time intervals, then a test 208 is performed by the microprocessor 80 to determine if at least one time interval was between the minimum and maximum allowable time intervals similar to test 152 in the New Transmitter ID operating state 139 shown in FIG. 5 and described above. If not, then processing returns to tests 190 and 198 to use the next transmission 21 received along with the three immediately preceding transmissions 21 to continue looking for four valid transmissions with three valid time intervals between transmissions 21 that meet all of the criteria described above. In the meantime, the microprocessor 80 remains in the Transmitter In Range and Not Locked operating state 157 but no message is yet transmitted to the remote host computer 28. If, however, at least one time interval was between the minimum and maximum allowable time interval, then lock between the transmitter 22 and the receiver (FMD) 24 is established at 210, the Transmitter In Lock (TIL) flag is set and a TIL message is logged at 212, a call to the host computer unit 28 is scheduled at 214 to transmit the logged TIL message, and processing is transferred, as shown in FIGS. 4 and 7, to the Transmitter In Range and Locked operating state 163 described above.

Figure 8:
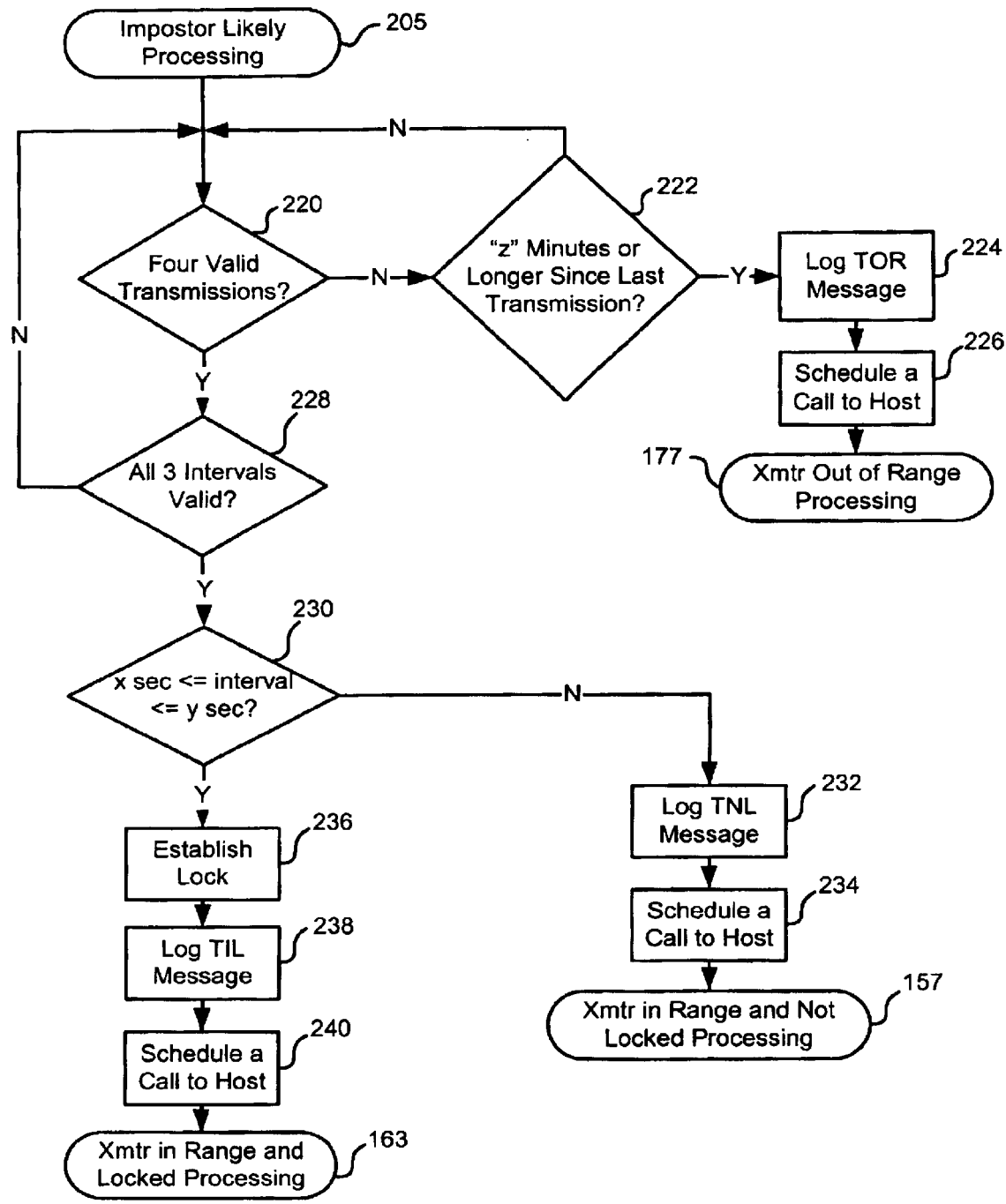
FIG. 8 is a flow chart of receiver (FMD) processing in the Impostor Likely state.

The processing for the Impostor Transmitter Likely operating state 205, as shown in FIG. 8, continues until the microprocessor 80 determines from the nature of additional transmissions 21 received or from the absence of transmissions 21 that the transmitter 22 is either in range and locked again 163, in range and not locked 157, or out of range 177. First, a test 220, similar to test 140 shown in FIG. 5, continues to check for reception of four valid transmissions 21, as defined above. If four valid transmissions 21 are not received, then test 222 is performed to determine if a predetermined time threshold, e.g., ten minutes, has passed since the last valid transmission 21, similar to the test 172 in the Transmitter In Range and Locked operating state 163 shown in FIG. 6 and similar to the test 192 in the Transmitter In Range and Not Locked operating state 157 shown in FIG. 7, which would indicate that the transmitter 22 has gone out of range. If not, processing returns to the previously-mentioned test 220 to continue looking for four valid transmissions 21 within a prescribed time window, e.g., five minutes. If, however, test 222 determines that it has been more than the time threshold "Z," e.g., ten minutes, since the last valid transmission 21 was received by the receiver (FMD) 24, the transmitter 22 has probably gone out of range. Therefore, the microprocessor 80 sets the Transmitter Out of Range (TOR) flag and logs a TOR message at 224 and schedules a call to the host computer unit 28 at 226 to report that the transmitter 22 is out of range by sending the logged TOR message. Processing is then transferred to the Transmitter Out of Range operating state 177 shown in FIGS. 4 and 8 and with processing shown in more detail in FIG. 9, where the microprocessor 80 continues to monitor for reception of valid transmissions 21 that would indicate the transmitter 22 has come back into range, as will be described below.

On the other hand, if the test 220 determines that four valid transmissions 21 have been received by the receiver (FMD) 24 within the time window, e.g., five minutes, then microprocessor 80 performs a test 228 to determine if all three time intervals between the four valid transmissions are valid, as defined for tests 148 and 198. If not, then processing returns to the previously-mentioned test 220 in which the microprocessor 80 continues to look for another four valid transmissions 21 within the predetermined time window, e.g., five minutes, as described above. If, however, all three of the time intervals are valid, then microprocessor 80 performs a test 230 to determine if at least one of the three time intervals from test 228 is between the minimum and maximum allowable time interval limits. If not, the microprocessor 80 sets the Transmitter Not Locked (TNL) flag and logs a TNL message at 232 and schedules a call to the host computer unit 28 at 234 to inform the host computer unit 28, by sending the logged TNL message, that the transmitter 22 appears to be in range in relation to the receiver (FMD) 24, but that the receiver (FMD) 24 has not locked onto all transmissions 21 from the transmitter 22. The microprocessor 80 then transfers processing to the Transmitter In Range and Not Locked operating state 157 described above until it determines either that the transmitter 22 goes out of range, that the transmitter 22 stays in range and the receiver (FMD) 24 becomes locked onto all transmissions 21, or that the transmissions may be coming from an imposter transmitter.

If one of the three intervals is between the minimum and maximum interval time limits as determined by the test 230, then lock is established at 236 (i.e., the time interval pattern used by the receiver (FMD) 24 and the transmitter 22 can be matched and the next transmission 21 time predicted from the now matched time interval patterns), and microprocessor 80 sets the Transmitter In Lock (TIL) flag and logs a TIL message 238 and schedules a call to the host computer unit 28 at 240 to report to the host computer unit 28 by transmitting the logged TIL message that the receiver (FMD) 24 has locked the transmissions 21 from the transmitter 22 into the pseudo-random time interval pattern being utilized. The microprocessor 80 then transitions to processing in the Transmitter In Range and Locked operating state 163, described above and shown in FIG. 6, where it remains until the receiver (FMD) 24 loses lock or synchronization of the patterns or until the transmitter 22 goes out of range.

Processing for the Transmitter Out of Range (TOR) operating state 177 is shown in FIG. 9. In this Transmitter Out of Range (TOR) operating state 177, the receiver (FMD) 24 continues to look for valid transmissions 21 at 250 and for valid time intervals at 252 to indicate that the transmitter 22 has come back into range in relation to the receiver (FMD) 24 and is either locked or not locked onto the transmissions 21 of the transmitter 22. In doing so, the microprocessor 80 first performs a test 250 to determine if four valid transmissions 21 are received within a predetermined window of time, e.g., five minutes, similar to the test 140 in the New Transmitter ID operating state 139 shown on FIG. 5, where valid is defined as for test 140. If not, the test 250 is repeated on successive transmissions 21 received by receiver (FMD) 24 until four valid transmissions 21 are received within the predetermined window of time, e.g., five minutes.

Once four valid transmissions 21 have been received within the predetermined window of time, e.g., five minutes, then microprocessor 80 performs a test 252 to determine if all three of the time intervals between the four valid transmissions 21 were valid, i.e., were integer multiples of the base timing increment similar to the test 148 of the New Transmitter ID operating state 139 shown in FIG. 5, and greater than or equal to the minimum time interval. If not, then the microprocessor 80 continues, at 250, to look for four valid transmissions within the predetermined time window, e.g., five minutes. If, however, the three time intervals are valid in test 252, then microprocessor 80 sets the Transmitter In Range (TIR) flag and logs a TIR message at 254 and proceeds to a test 256 to determine if at least one of the time intervals between the four transmissions 21 was between the minimum and maximum allowable interval time limits. If not, microprocessor 80 sets the Transmitter Not Locked (TNL) flag and logs a TNL message at 258 and schedules a call to the host computer unit 28 at 260 to report to the host computer unit 28 by sending the logged TIR and TNL messages that the transmitter 22 is in range, but that the receiver (FMD) 24 has not locked onto the transmissions 21 from the transmitter 22 and transfer to the Transmitter In Range and Not Locked operating state 157 of FIG. 7.

On the other hand, if at least one of the time intervals between the four valid transmissions 21 was between the minimum and maximum interval time limits, as determined by test 256, then lock is established at 262. Microprocessor 80 then sets the Transmitter In Lock (TIL) flag and logs a TIL message at 264 and schedules a call to the host computer unit 28 at 266 to report to the host computer unit 28, by sending the logged TIR and TIL messages, that the transmitter 22, thus also the offender 23, is within range of receiver (FMD) 24 and that receiver (FMD) 24 has locked onto the transmissions 21 from transmitter 22, i.e., the time interval patterns in the transmitter 22 and the receiver (FMD) 24 can be synchronized to enable the receiver (FMD) 24 to predict when the next transmission 21 will be received, as explained above in relation to test 178 in FIG. 6. As illustrated in FIGS. 4 and 9, microprocessor 80 then transfers processing to the Transmitter In Range and Locked operating state 163, where it continues "normal" monitoring of the transmissions 21 from transmitter 22, as described above.

As can be appreciated, quantities, times, and numbers, and other parameters used in the processing described above are arbitrary and could be selected differently, varied, or changed and still fall within the scope of the present invention. These variable, selectable, or changeable quantities include, but are not limited to, the number of time intervals in a time interval pattern, the number of time interval patterns, the minimum and maximum time interval limits, the base timing increment, the valid transmission time window, and the out of range time limit. Selection of each of these quantities is a matter of design choice that persons skilled in the art may make, once they understand the principles of this invention, to use the system 20 to monitor the offender's 23 presence or absence in a reasonably accurate manner. An additional consideration may include available power and useable life of the battery 30 in the transmitter 22, which may be lengthened by limiting number and size of signals 21 transmitted and the processing required by the transmitter 22 to generate time interval patterns. In order to reduce the data transferred to the host computer unit 28, it may be desirable to provide a similar system which does not log the Transmitter In Lock (TIL) messages and/or the Transmitter Not Locked (TNL) messages to reduce the communications to the host computer unit 28. If the Transmitter In Lock (TIL) and Transmitter Not Locked (TNL) messages are eliminated, the Transmitter In Range operating state could be used when the transmitter 22 is not only in range but also when it is locked. In other words, such an alternative would eliminate the Transmitter In Range/Not Locked operating state 157.

The host computer unit 28 can be a conventional computer with a receiver and transmitter modem that communicates with the receiver (FMD) 24 via the telephone network 26 shown in FIG. 1, or with any other suitable means of communication, such as direct RF communication, a wireless telephone link, direct wiring, an optical link, sound link, or any other communications systems now known or that may become known to persons skilled in the art. Typically, the host computer unit 28 may be programmed to include, or to have access to, offender 23 information and curfew information so that a determination can be made by the host computer unit 28 as to whether or not the offender 23 is violating his/her curfew, probation terms, etc., when the Transmitter Out of Range (TOR) or Transmitter Error Lock (TEL) messages are received from the transmitter 22. Alternatively, such offender or curfew information may be stored in the receiver (FMD) 24 and used by microprocessor 80 to determine if the offender 23 is in violation and to notify law enforcement or other offender monitoring personnel.

The host computer unit 28 can contact the receiver (FMD) 24 via the telephone network or other communications link 26 should it be necessary to interrogate or inquire as to the state of the receiver (FMD) 24 or to provide data or operating instructions to the receiver (FMD) 24. The receiver (FMD) 24 will contact the host computer unit 28 whenever any of the scheduled calls to the host are provided in the processing of the various operating states described above. In addition, the receiver (FMD) 24 will communicate with the host computer unit 28 on a periodic basis so that the host computer unit 28 knows that the receiver (FMD) 24 is still operational. The period between these communications from the receiver (FMD) 24 to the host computer unit 28 may be predetermined and set in the receiver (FMD) 24 by a law enforcement or corrections official or may be set via data provided from the host computer unit 28 to the receiver (FMD) 24 over the telephone network or other communication link 26 or may be varied and/or set in a random, semi-random, or other formulaic manner.

Typically, the host computer unit 28 only has a chance to provide data to the receiver (FMD) 24 when the receiver (FMD) 24 contacts the host computer unit 28. However, the system can be set up so that the receiver (FMD) 24 will answer calls on the phone line, such as, for example, when a long ring sequence or a special ring sequence is received from the host computer unit 28. Typically, when the law enforcement or corrections official attaches a new transmitter 22 onto an offender 23, the law enforcement or corrections official will be able to command the receiver (FMD) 24 to place a call to the host computer unit 28 immediately to initiate New Transmitter ID processing state 139 of FIG. 5.

With the system 20 of the present invention, a single receiver (FMD) 24 could track multiple transmitters 22 simultaneously as long as enough processing power and speed are available in the receiver (FMD) 24 and each of the transmitters 22 are used within a desirable monitoring range of the receiver (FMD) 24 or transmitting range of each transmitter 22.

A second embodiment of the present invention may differ from the first embodiment in that a portion of the data bits provided in each transmission 21 may provide information representative of the location of the current transmission 21 within the pseudo-random pattern of time intervals between consecutive transmissions 21. Thus, in such a second embodiment, once a single transmission 21 has been received, the microprocessor 80 in the receiver (FMD) 24 will be able to determine, thus know, exactly where such transmission 21 and associated time interval combination is in the pattern of pseudo-randomly varying time intervals, and it will not have to track several transmissions 21 in order to make the same determination. For this reason, by the time four valid transmissions 21 have been received so that the transmitter 22 can be determined to be in range, the receiver (FMD) 24 will already be locked onto the transmitter 22. The data bits relating to the location in the pattern do not necessarily have to be read when each transmission 21 is received. Instead, the receiver (FMD) 24 can read these bits only for the first received transmission 21 and then, with the location in the pattern known, there is no need to look at the bits again, unless lock is lost.

The foregoing description is considered as illustrative only of the principles of the invention. Furthermore, since numerous modifications and changes will readily occur to those skilled in the art, it is not desired to limit the invention to the exact construction and process shown as described above. For example, as described in relation to test 140 of FIG. 5, any incremental unit of time may be employed, including milliseconds, microseconds, whole seconds (as discussed in the above examples), or any other measure of time, such as the resolution of a microprocessor clock or timing circuit which is typically measured in nanoseconds. Further, it may be desirable to vary the incremental time unit used periodically according to a pattern, such as a pseudo-random pattern, that is known or determinable by both the transmitter 22 and the receiver 24. For example, but not as a limitation, the incremental time unit could be reset once every hour or other time period according to a unique pattern, such as from one (1) second to two (2) seconds to some other multiple or fraction of a second and so on.

Additionally, the time intervals in the time interval patterns, as discussed for test 178 of FIG. 6, do not necessarily have to be unique, i.e., the time intervals can be repeated, to allow identification of a signal 21 in a time interval pattern and authentication of a transmitter 22. For example, in the second embodiment described above, each transmission 21 includes information that allows the receiver 24 to determine the location of the transmission 21 within a given time interval pattern, e.g., by going to a look up table or to a mathematically determined pattern or the like, and to predict when the next transmission 21 should be received. Clearly, in this second embodiment, repeating time intervals would be acceptable, and such a time interval pattern may have signals 21 being transmitted in patterns similar to the following simple illustrative pattern: 3 seconds, 5 seconds, 5 seconds, 3 seconds, 8 seconds, 5 seconds, and so forth. As long as the transmission 21 included information indicating location in the pattern, the receiver 24 could readily determine if later received transmissions 21 fit the time interval pattern. This type of time interval pattern could also be utilized if additional tests were used to "lock in" a transmitter 22. These additional tests could verify that a number of valid transmissions 21 had been received and then could look for sets of two, three, or more time intervals that fit within the time interval pattern so the next expected transmission 21 would be in 8 seconds. With the above simple example, the receiver 24 could receive three valid transmissions 21 at intervals of 5 and 3 seconds, and this pair of time intervals could be used to identify the location in the time interval pattern. With this type of testing, the intervals would not have to be unique but a subset of the intervals would have to be identifiable within the overall time interval pattern.

All suitable modifications and equivalents may be resorted to falling within the scope of the invention as defined by the claims which follow. Particularly, although the above description was directed, for illustrative and enabling purposes, to monitoring a person placed under geographic and time restrictions, the authentication techniques described would clearly be useful in any monitoring application in which a transmitter sends a series of signals to a receiver that must then determine if the signals received are from a particular or non-imposter transmitter. The words "comprise," "comprises," "comprising," "include," "including," and "includes" when used in this specification and in the following claims are intended to specify the presence of stated features, integers, components, or steps, but they do not preclude the presence or addition of one or more other features, integers, components, steps, or groups thereof.

The invention claimed is:

1. A monitoring system for monitoring location of a person or thing to be monitored, comprising:
  a transmitter, associated with the person or thing to be monitored, for transmitting authentic signals at time intervals that vary according to a pattern and which include information representative of respective current positions where such authentic signals occur in said pattern of various time intervals in order to predict when a subsequent authentic signal from the transmitter is expected; and
  a receiver for receiving signals, said receiver being operative to use said current position information in a received authentic signal to identify a subsequent time interval from said pattern of various time intervals in order to predict when a subsequent authentic signal from the transmitter is expected, and, further, to determine whether an actual subsequently received signal is an authentic signal that is actually transmitted by said transmitter based on whether such subsequent signal is received when expected in the pattern of various time intervals.

2. The monitoring system of claim 1, wherein said determination by said receiver is also based upon transmitter identification information included in said signals from said transmitter.

3. The monitoring system of claim 1, wherein durations of the various time intervals in said pattern are pseudo-random.

4. The monitoring system of claim 1, said monitoring system further comprising a remote host computer communicatively linked to said receiver and to at least one presence and absence enforcement facility, and wherein said receiver is operable to determine, and communicate to said remote host computer, a present operating state of said transmitter based on said received authentic signals, said present operating state being one of New Transmitter ID Received, Transmitter In Range and Locked to Transmitter, Transmitter in Range but Not Locked to Transmitter, Transmitter Out of Range, or Imposter Likely.

5. The monitoring system of claim 4, wherein said receiver is operable to remain in at least one of said present operating states for a threshold time period without said receiver receiving a signal determined by said receiver to be an authentic signal transmitted by said transmitter.

6. The monitoring system of claim 4, including at least two of said transmitters communicatively linked to said receiver.

7. The monitoring system of claim 1, wherein said pattern has a predetermined number of time intervals and wherein said transmitter transmits said authentic signals on a continuing basis by repeating said number of time intervals of said pattern.

8. The monitoring system of claim 1, wherein said transmitter and said receiver are operable to generate said pattern.

9. The monitoring system of claim 8, wherein said pattern includes at least two subpatterns in a selectable order and each of said transmitter and said receiver includes at least two subpattern generators to generate said at least two subpatterns.

10. The monitoring system of claim 9, wherein each of said transmitter and said receiver includes at least one selection device for determining said selectable order of said at least two subpatterns in said pattern.

11. The monitoring system as defined in claim 10, wherein said authentic signals transmitted by said transmitter include selection information and said at least one selection device of said receiver and transmitter use said selection information for said determining of said selectable order of said subpatterns in said pattern.

12. A method of authenticating transmission signals from a particular transmitter being used to monitor location of a person or a thing to be monitored, said method comprising:
  placing a transmitter, for transmitting signals at time intervals that vary according to a pattern, at the location of the person or thing to be monitored;
  providing a receiver for receiving signals;
  generating said pattern by operating at least two subpattern generators at said transmitter and at least two subpattern generators at said receiver so that said pattern includes at least two subpatterns in selectable order;
  transmitting signals from said transmitter at said time intervals according to said pattern;
  operating said receiver to receive signals; and
  authenticating with said receiver whether said received signals are said transmitted signals from said transmitter by measuring time intervals between consecutive ones of said received signals and comparing said measured time intervals with said pattern.

13. The method of claim 12, wherein said authenticating includes the steps of:
  receiving with said receiver at least two signals from said transmitter;
  measuring a time interval between a consecutive pair of said at least two signals;
  comparing said measured time interval to said pattern to identify a first location in said pattern;
  selecting a next time interval from said pattern relative to said first location;
  receiving a next signal after a second time interval; and
  comparing said next time interval to said second time interval, wherein said received signals are authenticated as being from said receiver when said next time interval and said second time interval are substantially equal;
  wherein said receiving said at least two signals from said transmitter step includes validating said received signals based on transmitter identification information associated with said transmitter and included by said transmitter in each of said transmitted signals.

14. The method of claim 13, wherein said validating further includes comparing a measured time interval between a received signal and a previously received, consecutive signal to a predetermined minimum time interval, said received signal being invalid if said measured time interval is less than said minimum time interval.

15. The method of claim 12, wherein said authenticating includes verifying that each of said received signals include transmitter identification information associated with said transmitter.

16. The method of claim 12, wherein each of said transmitter and said receiver includes at least one selection device for determining said selectable order and further wherein said generating includes operating said at least one selection device to determine said selectable order of said at least two subpatterns in said pattern.

17. A method of authenticating transmissions received by a receiver as having originated from a particular transmitter, comprising:
  developing a pattern of sequential time intervals in which each time interval has a different duration;
  actuating the transmitter to transmit a plurality of authentic signals in a sequence that has time intervals between successive transmitted authentic signals that match in duration and in sequence with the durations of the time intervals of said pattern;
  measuring intervals between successive signals received by the receiver and testing such measured time intervals between successive received signals for compliance with at least one of the time intervals in the pattern;
  upon finding a match between a measured time interval between received signals and a time interval in said pattern, predicting, based on said pattern, a time when another authentic transmission is expected to be received; and
  upon receiving another signal, determining whether said another signal has actually been received at the time when said another authentic transmission was expected to be received.

18. The method of claim 17, including developing said pattern to be semi-random.

19. The method of claim 17, including determining that said receiver is in range and locked onto transmissions from said transmitter based on said another signal having been received when an authentic transmission had been expected.

20. The method of claim 17, including determining whether some of said time intervals between successive received signals are equal.

21. The method of claim 20, including determining, based on some of said time intervals between successive received signals being equal, that an imposter transmitter is likely within range of said receiver.

22. The method of claim 17, wherein the durations of the time intervals are integer multiples of a base timing increment.

23. The method of claim 22, including continuing to monitor signals received by said receiver for a threshold number of valid transmissions received, where a valid transmission includes occurring on an integer multiple of said base timing increment.

24. The method of claim 23, including determining that said transmitter is out of range of said receiver based on not receiving a valid transmission within a selected period of time.

25. The method of claim 23, including determining that said transmitter is in range of said receiver based on: (i) reception of said threshold number of valid transmissions; and (ii) time intervals between said valid transmissions matching time intervals in said pattern.

26. The method of claim 25, including determining whether said time intervals between said valid transmissions are between said minimum duration and said maximum duration.

27. The method of claim 26, including determining that the receiver is in range and locked onto said transmissions of said transmitter based on said time intervals between said valid transmissions being between said minimum duration and said maximum duration.

28. The method of claim 26, including determining that the receiver is in range and not locked onto said transmissions of said transmitter based on said time intervals between said valid transmissions not being between said minimum duration and said maximum duration.

29. The method of claim 22, wherein the durations of the time intervals are in a range between a minimum duration and a maximum duration.

30. A monitoring system for monitoring location of a person or thing to be monitored, comprising:
   a transmitter, associated with the person or thing to be monitored, for transmitting signals at time intervals that vary according to a pattern which has a predetermined number of time intervals and includes at least two subpatterns in a selectable order, wherein said transmitter is operable to generate said pattern and includes at least two subpattern generators to generate said at least two subpatterns; and
   a receiver for receiving signals, said receiver being operative to determine if received signals are transmitted by said transmitter based on said signals from said transmitter being received at time intervals according to said pattern, wherein said receiver is also operable to generate said pattern and includes at least two subpattern generators to generate said at least two subpatterns.

31. The monitoring system of claim 30, wherein each of said transmitter and said receiver includes at least one selection device for determining said selectable order of said at least two subpatterns in said pattern.

32. The monitoring system of claim 31, wherein said signals transmitted by said transmitter include selection information and said at least one selection device of said receiver and of said transmitter use said selection information for said determining of said selectable order of said subpatterns in said pattern.

33. A method of authenticating transmission signals from a particular transmitter being used to monitor location of a person or a thing to be monitored, said method comprising:
   placing a transmitter at the location of the person or thing to be monitored for transmitting authentic signals at time intervals according to a pattern in which individual time intervals are unique;
   providing a receiver for receiving signals from said transmitter at said time intervals according to said pattern;
   operating said receiver to receive signals transmitted by the transmitter;
   measuring a time interval between a pair of received signals;
   comparing such measured time interval with the unique time intervals in the pattern to identify where such measured time interval is located within the pattern;
   determining when to expect at least one subsequent signal transmission from said transmitter based on where said measured time interval is located in the pattern and on time durations of successive next time intervals to come in the pattern;
   receiving a subsequent signal, determining if such subsequent signal is received when expected, and, if received when expected, treating such subsequent signal as an authentic transmission by said transmitter as opposed to a possible unauthentic transmission by an imposter transmitter.

34. The method of claim 33, including:
transmitting said signals from said transmitter with transmitter identification information associated with said transmitter in said signals; and
verify that signals received by the receiver are valid as containing the transmitter identification information before using such signals to determine location in the pattern and to authenticate said subsequent signals as having been transmitted by said transmitter.

35. The method of claim 34, including monitoring elapsed time after receipt of a signal that has been verified as valid based on containing the transmitter identification information, and, if a predetermined maximum time threshold elapses without receipt of another signal that is verified as valid based on containing the transmitter identification information, then logging a transmitter out of range (TOR) message.

36. The method of claim 33, including:
   creating each time interval in the pattern as being an integer multiple of a base timing increment; and
   before using a time interval between a pair of received signals for determining location of such time interval in the pattern, verifying that such time interval is valid as being an integer multiple of said base timing increment.

37. The method of claim 36, including verifying that multiple successive time intervals between received signals are valid as being integer multiples of said base timing increment before determining location of a time interval in the pattern.

38. The method of claim 37, including logging an indication of transmitter first found (TFF) upon verifying that a minimum threshold number of multiple successive time intervals between received signals are valid as being integer multiples of said base timing increment.

39. The method of claim 38, including designating whether the receiver is locked onto transmissions by the transmitter based on whether at least one of the time intervals of the minimum threshold number has a duration that falls within a range between a pre-set minimum limit and a pre-set maximum limit for time interval duration, and, if so, logging a transmitter in lock (TIL) designation, but, if not, logging a transmitter not locked (TNL) designation.

40. The method of claim 33, including providing the pattern for comparing the measured time interval between received signals independent of actual transmitted signals received.

41. In a monitoring system for monitoring location of a particular person or thing, wherein the monitoring system includes a particular transmitter positioned at the location of the particular person or thing and being capable of transmitting authentic signals that include identification information which identifies said particular transmitter, and wherein the monitoring system includes a receiver capable of receiving authentic signals transmitted by said particular transmitter and of recognizing the identification information in such signals to determine that such authentic signals are valid as having come from said particular transmitter, the improvement comprising:
   authentication means for determining if apparently valid signals, which are received by the receiver and contain the information that identifies said particular transmitter, are actually authentic signals transmitted by said authentic transmitter as opposed to imposter signals transmitted by an imposter transmitter that is enabled to transmit imposter signals which include said identification information, the authentication means including;
   pattern means for providing a pattern of a plurality of time intervals in which the time intervals have different lengths, and wherein the particular transmitter is programmed to transmit a plurality of authentic signals at time intervals which match the time intervals of said pattern;

actual time interval detection means for determining actual time intervals between sequentially received signals which contain said identification information; and pattern detection means for comparing an actual time interval detected by the actual time interval detection means with the time intervals in the pattern and, if a matching time interval in the pattern is found, predicting based on said pattern, when a subsequent authentic signal is expected to be received.

42. The improvement of claim 41, wherein the authentication means includes signal identification means associated with the receiver for detecting signals received by the receiver that include said identification information.

43. The improvement of claim 42, wherein the authentication means includes pattern confirmation means for checking whether a subsequent actual signal with said identification information is received when a subsequent authentic signal is expected to be received as predicted by said pattern detection means, and, if so, accepting that such subsequent actual signal is an authentic signal that was transmitted by the particular transmitter, but, if not, then rejecting such subsequent actual signal as a likely imposter.

44. The improvement of claim 42, wherein the authentication means includes the particular transmitter being operative to include position information in an authentic signal transmission that indicates the position of the authentic signal transmission in the pattern.

45. The improvement of claim 44, wherein the authentication means includes means for using the position information in the authentic signal to predict, based on said pattern, when a subsequent authentic signal is expected to be received.

46. The improvement of claim 45, wherein the authentication means includes pattern confirmation means for checking whether a subsequent actual signal with said identification information is received when a subsequent authentic signal is expected to be received as predicted, and, if so, accepting that such subsequent actual signal is an authentic signal that was transmitted by the particular transmitter, but, if not, then rejecting such subsequent actual signal as a likely imposter.

* * * * *